United States Patent
Yost et al.

(10) Patent No.: US 11,697,043 B2
(45) Date of Patent: Jul. 11, 2023

(54) METHOD AND REAGENTS FOR TREATING MATERIALS CONTAMINATED WITH MERCURY, PFAS, OR OTHER CONTAMINANTS

(71) Applicant: HMR Solutions, Inc., Brooklyn, NY (US)

(72) Inventors: Karl William Yost, Anacortes, WA (US); Jody Bickford, Butte, MT (US)

(73) Assignee: HMR Solutions, Inc., Brooklyn, NY (US)

( * ) Notice: Subject to any disclaimer, the term of this patent is extended or adjusted under 35 U.S.C. 154(b) by 363 days.

(21) Appl. No.: 16/861,979

(22) Filed: Apr. 29, 2020

(65) Prior Publication Data
US 2020/0338378 A1    Oct. 29, 2020

Related U.S. Application Data

(60) Provisional application No. 62/840,302, filed on Apr. 29, 2019.

(51) Int. Cl.
| | |
|---|---|
| *A62D 3/36* | (2007.01) |
| *A62D 3/38* | (2007.01) |
| *B09C 1/08* | (2006.01) |
| *B09B 3/10* | (2022.01) |
| *A62D 101/22* | (2007.01) |

(52) U.S. Cl.
CPC .............. *A62D 3/36* (2013.01); *A62D 3/38* (2013.01); *B09B 3/10* (2022.01); *B09C 1/08* (2013.01); *A62D 2101/22* (2013.01)

(58) Field of Classification Search
CPC ........ A62D 3/36; A62D 3/38; A62D 2101/22; B09B 3/10; B09C 1/08
USPC .......................................................... 588/318
See application file for complete search history.

(56) References Cited

U.S. PATENT DOCUMENTS

| | | |
|---|---|---|
| 7,585,132 B2 | 9/2009 | Imbrie |
| 8,940,958 B2 | 1/2015 | McLaughlin |
| 9,199,184 B2 | 12/2015 | Mallavarapu et al. |
| 9,770,743 B2 | 9/2017 | Mork et al. |
| 9,776,898 B2 | 10/2017 | Wilson et al. |
| 10,005,684 B2 | 6/2018 | Wilson et al. |
| 2012/0049114 A1 | 3/2012 | Seeker et al. |
| 2013/0168321 A1 | 7/2013 | Cannon et al. |
| 2014/0124441 A1 | 5/2014 | Ikeda |
| 2018/0319685 A1 | 11/2018 | Ball et al. |
| 2018/0361443 A1 | 12/2018 | Mork |
| 2019/0118149 A1* | 4/2019 | Alexander ............ B01F 29/252 |
| 2019/0336937 A1 | 11/2019 | Clark et al. |
| 2020/0338378 A1* | 10/2020 | Yost ..................... B09C 1/08 |

FOREIGN PATENT DOCUMENTS

| | | |
|---|---|---|
| KR | 20090067664 A | 11/2009 |
| WO | 199306952 A2 | 4/1993 |
| WO | 2013119121 A1 | 8/2013 |

OTHER PUBLICATIONS

ISR/WO from Applicant's counterpart PCT Application: PCT/US2020030538 (ISR/WO dated Aug. 4, 2020).
Ross, et al., A Review of Emerging Technologies for Remediation of PFAS, Remediation 2018, vol. 28, pp. 101-126.
ITRC, Remediation Technologies and Methods for PER- and Polyfluoroalkyl Substances (PFAS), Mar. 2018.
ARCADIS—PowerPoint presentation, 2016 (7 pages submitted herewith).
CRIMI, PFAS Treatment and Remediation Webinar: Treatment Options for Soil and Groundwater, Dec. 2016.
ITRC, Interstate Technology & Regulatory Council (ITRC) 2020 PFAS Technical and Regulatory Guidance Document and Fact Sheets PFAS-1. Washington DC.
Darlington et al., The Challenges of PFAS Remediation.
Zhu, Analysis of Organoclays and Orgnic Adsorption by Clay Minerals Kundoc.com—2010.
GHD—Best Practices for PFAS Waste Disposal—website: ghd.com.
GHD—PFAS Insights—https://www.ghd.com/en/about-us/pfas-insights—Dec. 2018.
Princeton University—Microbe Chews through PFAS and other Tough Contaminants—Science Daily.com, Sep. 18, 2019.
Washington State University, Dept. of Civil and Environmental Engineering, Degradation of Perfluorooctanoic Acid (PFOA) by Reactive Species Generated through Catalyzed H2O2 Propagation Reactions, Published in Environmental Science & Technology Letters 2014. 1. 117-121.

* cited by examiner

*Primary Examiner* — Edward M Johnson
(74) *Attorney, Agent, or Firm* — John D. Carpenter

(57) ABSTRACT

A reagent set includes an oxidant, acid, and adsorbent, which is used in a method for reducing the leachability and release of PFAS, mercury, and other contaminants from soils, sediments, and other solid materials or waste when treated materials are exposed to acid rain, snow melt, runoff, landfill leachate, etc. The reagents are mixed with a quantity of contaminated material and water is added as needed in order to reduce the leachability of the contaminants from the treated host material, where the admixture end-product suitably removes contaminants from fluids that contact and/or otherwise permeate and/or pass through and/or around the treated admixture. The reagent set and method of use offer environmental professionals long-term, economically viable waste management solutions for removing contaminants from contamination source areas, spill and manufacturing release sites, impacted media, and landfills, as well as from the fluids that contact reagent-treated material.

14 Claims, 4 Drawing Sheets

METHOD AND REAGENTS FOR TREATING MATERIALS CONTAMINATED WITH MERCURY, PFAS, OR OTHER CONTAMINANTS

CROSS-REFERENCE TO RELATED APPLICATION(S)

This application claims the benefit of U.S. provisional patent application No. 62/840,302, filed Apr. 29, 2019, the entire contents of which are incorporated herein by this reference.

FIELD OF THE INVENTION

The invention relates to methods and reagents for remediating contaminated soil, sediment, and other solid waste that contain leachable substances, such as perfluoroalkyl and polyfluoroalkyl substances (PFAS), heavy metals such as mercury, etc.

BACKGROUND OF THE INVENTION

A significant amount of research has been directed at identifying treatment methodologies for mercury, other heavy metals, and PFAS. PFAS encompass a family of thousands of chemicals that are used in industrial and commercial products. As a group, PFAS chemicals are highly resistant to heat, water, and oil, making them useful for industrial applications and consumer products and one of the most widely used class of chemicals in the world. The same chemical properties that make PFAS so effective in processing applications and consumer products make them hard to remediate. As a result, PFAS are persistent in the environment and bioaccumulate—and biomagnify in human and animal tissues—meaning they are adsorbed at a faster rate than they are removed from those tissues and then increase in concentration within an organism. This is especially true for long-chain PFAS chemicals (Darlington et al., "The Challenges of PFAS Remediation", Samenews.org) and the result has been troubling environmental and health problems across the United States and the world.

PFAS are a class of synthetic, fluorinated organic compounds used in industry and consumer products. PFAS are toxic at low concentration levels (parts per trillion—ppt). PFAS accumulation and amplification in the tissues and fat in animals and humans, cause tumors and disorders in the blood, liver and kidneys, and also precipitate reproductive, developmental, and immune system complications. Research has shown that PFAS exposures can be linked to increased cholesterol, infant birth weight abnormalities, and cancer. According to a 2007 study from the US Centers for Disease Control and Prevention, PFAS can be found in 98% of the U.S. population and are often referred to as "forever chemicals."

PFAS are highly soluble in water and they do not degrade over time in the environment. They make water "slippery." They have been utilized around the world in manufacturing since the 1950's in Teflon® brand products, food packaging, non-stick cookware, and other common products such as water-proof/stain-resistant fabrics, cleaning products, polishes/waxes, shoes, carpets, makeup, intravenous tubing, and many other household and items. In commercial and industrial applications, PFAS are used in suppression foams for fire-fighting and odor/fume control in the electroplating industry due to their hydrophobic properties and stability at high temperatures.

PFAS and related chemicals include numerous synthetic compounds comprised of carbon and fluorine in various long- and short-chain molecules. Two PFAS compounds that have been studied extensively include perfluorooctanoic acid (PFOA) and perfluorooctanesulfonic acid (PFOS). The U.S. Environmental Protection Agency (EPA), various state environmental and public regulatory agencies, and private-sector researchers are working to explore further the impact and effects of PFAS, and in particular PFOA and PFOS. While the EPA has decided (as of 2019) not to establish a regulatory limit for total or leachable PFAS, it has recommended an advisory contaminant level of less than 70 ng/L (ppt) as being considered safe for drinking water. Many state regulatory agencies are working to establish lower regulated limits. PFAS are classified by the EPA as falling under the Unregulated Contaminant Monitoring Rule (UCMR) amendment of the Safe Drinking Water Act.

Because of PFAS' stability, solubility, water repellency, and lubricative properties, PFAS can readily migrate through soil to enter groundwater aquifers, natural waterways, agricultural irrigation systems, and drinking water supplies and food chains. As constituents in residential, commercial, and industrial solid waste typically managed at Resource Conservation and Recovery Act (RCRA) permitted solid waste landfills, PFAS are also widely present in landfill facilities. As a result, PFAS leach from the waste and migrate through the waste cell carried by precipitation and percolation. PFAS enter landfill leachate capture, collection, conveyance, and treatment systems where leachate is processed to meet landfill waste-lift compaction, dust control, land application requirements, and/or regulatory pre-treatment permit guidelines for discharge to sanitary sewer systems. PFAS also enter sanitary sewage systems through human waste material released to the sewer as well as industrial and other sewerage discharge sources where PFAS are utilized and/or released.

Unfortunately, current landfill leachate, sanitary sewage, and potable drinking water treatment systems are not able to destroy PFAS in water, and, at best, with PFAS being only partially removed from water with current conventional treatment technologies, PFAS accumulate in biosolids generated by landfill leachate and sanitary sewage wastewater treatment facilities. By design, biologic treatment activity is intended to consume organic material to minimize solids and degrade contaminants, but such widely practiced treatment does not destroy PFAS or similarly related recalcitrant "forever" chemical compounds. Of further concern, research data suggest that biological degradation activity of organic matter may serve to break longer chain PFAS and other molecules to smaller molecular forms that are even more susceptible to release by leaching and migration in carrier fluids, as well as potentially causing an increase in contaminant toxicity. Biosolids are often disposed in landfills or applied to agricultural fields, and wastewater treatment plant effluent is typically discharged through permitted outfalls to natural waters that are often sources for downstream irrigation and potable water supplies.

Historic PFAS release to the environment has also occurred at fire sites where aqueous film forming foam (AFFF) is used to control and extinguish all types of fires, ranging from structure fires, to accident sites, to forest fires. AFFF contains extremely elevated levels of PFAS, and when applied with copious amounts of water for immediate fire suppression, PFAS are released to soils and sewers via water run-off. Such release is extremely prevalent at firefight training sites, including those at public airports and military airfields. Also, when PFAS are used in the manufacture of products such as fabrics, carpets, cleaning products, makeup, and other items, PFAS are often stored in liquid concentrated form in tanks or other containers. During handling and incorporation into manufactured products, PFAS spillage and releases can occur, contaminating soil and entering drain systems. As a result, PFAS migrate into soil, groundwater, stormwater run-off, and storm and sanitary sewer systems.

When released to site soils, PFAS can be a long-term source of contamination to underlying groundwater, where plumes can migrate further throughout the aquifer at rates that depend on hydraulic conductivity and formation transmissivity. Unless the contaminated soil is treated, PFAS will continue to be a problem. Thus, site remediation should address both soil and groundwater contamination. For soil, conventional mitigation methods to prevent further release of contaminants include soil excavation and disposal at off-site disposal facilities or onsite material management methods, including consolidation with appropriate engineering controls. With PFAS pervasiveness and toxicity, and regulatory uncertainty, landfill owners and operators are not universally accepting PFAS-contaminated waste or the risk that such materials may result in PFAS-contaminated leachate, especially where landfills are located in regions of high precipitation. Onsite management options are possible at remediation cleanup sites; however, controls must be significant to prevent PFAS release to underlying groundwater and surface water run-off.

Current efforts to mitigate PFAS-impacted soils, solids, and sediments include (1) excavation with offsite disposal via landfill internment or incineration, (2) soil washing or aggressively leaching PFAS from soil, and (3) capping contaminated materials. The balance of the remaining PFAS-relevant soil treatments are generally soil sorption and stabilization, chemical degradation, or destructive techniques such as thermal desorption (Ross et al., "A Review of Emerging Technologies for Remediation of PFAS", Remediation 2018, Volume 28, pages 101-126).

Excavation of impacted soil and its offsite disposal in a landfill is relevant for PFAS-impacted source zone soils or spent PFAS water treatment adsorptive media, such as activated carbon or ion exchange resins. However, high cost and potential long-term liability are real limitations to this approach, given PFAS persistence and limited PFAS treatment or monitoring in most landfill leachates. (Ross et al., "A Review of Emerging Technologies for Remediation of PFAS", Remediation 2018, Volume 28, pages 101-126). Despite the UCMR status of PFAS, many companies that operate licensed RCRA Subtitle D (non-hazardous) or Subtitle C (hazardous) landfills have already elected not to accept solid waste that contains PFAS, particularly in geographies of the country where precipitation in the form or rain and/or snow increase volumes of leachate requiring subsequent management. Landfills that still accept soil from environmental cleanup project sites, spent carbon, and other media containing PFAS are generally located where annual precipitation is extremely limited and the climate is arid, thus reducing leachate volumes and the associated risk of PFAS release from disposal facilities.

Soil washing or leaching PFAS from contaminated soil may be suitable to minimize volumes of PFAS waste. However, leachate and soil fines collected from this treatment method can be complex and expensive. Capping of soil left in place or containment of excavated soil within engineered repositories to prevent infiltration and leaching to groundwater have both been implemented and require long-term management. However continued liability and restrictions on redevelopment are key limitations to this approach. (Ross et al., "A Review of Emerging Technologies for Remediation of PFAS", Remediation 2018, Volume 28, pages 101-126).

The risks and liabilities associated with PFAS have lead some waste generators to take a more conservative and expensive approach to disposal. Even though incineration is not required by law, many generators have elected to incinerate their waste at a permitted hazardous waste incineration facility due to the difficulty of treating PFAS waste. Hazardous waste incineration may not be the most cost-effective disposal method for PFAS wastes, but currently it still ranks as the Best Demonstrated Available Technology. Thermal destruction via incineration is a proven method treatment/disposal technology—most hazardous waste incineration facilities reach temperatures in excess of 1800° F., which has been proven to destroy most hazardous constituents. Of course incineration is prohibitively costly for generators with large volumes of contaminated soil, spent water treatment media, and biosolids, for example, and many generators are "managing" contaminated PFAS media by temporary storage or containment. ("Best Practices for PFAS Waste Disposal—GHD, GHD website-ghd.com)

Carbon amendments can be modified to enhance their sorption of PFAS. (Remediation Technologies and Methods for Per- and Polyfluoroalkyl Substances (PFAS), Interstate Technology Regulatory Council (ITRC)). One patented product, RemBind®, is carbon enhanced with aluminum hydroxide, kaolin clay and other proprietary sorbents. (U.S. Pat. No. 8,940,958 B2). Another patented soil and groundwater stabilization treatment product, PlumeStop®, consists of very fine activated carbon, a stabilizing polymer, and a distribution enhancement agent (U.S. Pat. No. 9,770,743). ViroLock™ is another treatment technology (U.S. patent application Ser. No. 16/466,803) that teaches the use of Bauxsol, activated carbon, and an oxidizer to treat persistent organics including fluoro surfactants in water, where Bauxsol is "neutralized" red mud from bauxite refining, a highly alkaline poly-mineral-based reagent comprised of minerals such as hematite, gibbsite, titanium oxides, and other mineral forms. Other sorption and stabilization techniques also use mineral sorbents, such as iron oxide materials (Korean Patent No. KR20090067664A), and modified organoclays such as montmorillonite, hydrotalcite, and palygorskite). Minerals such as clays, silica, iron oxides and zeolites have been used as sorbents for treating contaminants from groundwater and soil. The surface of organoclays can also be modified with surfactants and amine or amino groups for enhanced PFAS sorption. ((Remediation Technologies and Methods for Per- and Polyfluoroalkyl Substances (PFAS), ITRC)). Another patented PFAS technology, matCARE™, uses a modified palygorskite clay (another mineral) with a cationic surfactant for PFAS treatment in soil. (U.S. Pat. No. 9,199,184 B2).

Current technologies for treating PFAS in concentrated forms such as fluids and products such as AFFF, ion exchange resin, other solids such as highly contaminated activated carbon derived from the removal of PFAS from fluids, focus on thermal destruction of PFAAS. Chemical degradation technologies have also been employed for PFAS treatment, using either oxidation or reduction processes, and have potential for use in in situ applications. While certain oxidative methods have achieved up to 100% degradation of PFOS, these methods typically employ high concentrations of oxidants and elevated temperatures, making them impractical for most PFAS remediation needs. The conditions applied in the tests resulting in effective degradation cannot reasonably, safely, or economically be applied in practice for PFOS treatment. ((Remediation Technologies and Methods for Per- and Polyfluoroalkyl Substances (PFAS), ITRC)), and there remains a substantial, unmet need for a technical solution to address the migration of PFAS from solids and solid waste that contain PFAS.

In addition to the environmental problems associated with PFAS contamination, environmental pollution due to mercury and other heavy metals in soil, mining residues, and other solid wastes is also a serious problem. Groundwater contamination resulting from the leaching out, mobilization, and entry of heavy metal species into the water table is of particular concern. RCRA; 42 U.S.C. § 6901 et seq. directs the EPA to establish controls on the management of hazardous wastes, from the point of generation, through transport, storage, and disposal. Title 40 of the Code of Federal Regulations (CFR) provides the regulatory framework for complying with RCRA.

RCRA identifies eight heavy metals that warrant particular concern—whether in elemental, ionic, or covalent species form—because of their toxicity to human and other life: arsenic, barium, cadmium, chromium, lead, mercury, selenium, and silver. The EPA regulates the allowable limits for these metals in the parts-per-million (ppm) range: 1-5 ppm, depending on the metal; 0.2 ppm for mercury. Mercury, in particular, is a primary concern due to its toxicity when present in solid, liquid, and vapor forms. Elemental mercury and its ionic and organometallic complexes are extremely toxic when present in soils and sediments, waterways and/or the atmosphere.

Numerous methodologies exist for addressing solid wastes contaminated with heavy metals. They vary widely in their effectiveness, suitability for a given site, breadth of metal-specific efficacy, and cost. For mercury, much attention has been paid to the treatment of mercury in soil, solid waste, and other materials. These technologies have often relied upon recovery of mercury using high temperature retort or other thermal processes (U.S. Pat. Nos. 7,691,361 B1 and 8,501,107). Unfortunately, these recovery options are not viable for many situations, both from the perspectives of cost and efficacy, and toxicity to humans and the environment. Although regulations governing the reuse of elemental mercury have become increasingly stringent, and manufacturers have shifted to other more environmentally sound, less toxic options, numerous contaminated sites remain in need of remediation.

Other attempted methods for remediating mercury contamination have utilized various chemical techniques. Examples include mixing the contaminated material with sulfur and calcium-based sulfides, controlling pH using calcium (and/or magnesium) alkaline earth agents, and introducing calcium-based-phosphate and phosphate salt additives to mitigate iron issues (U.S. Pat. Nos. 5,877,393 and 5,898,093). Other techniques include the use of less effective polysulfide, other heavy metals to help complex formation, and oxidation/reduction reaction drivers to convert mercury to more or less reactive forms for scavenging or other recovery or capture methods.

Physical immobilization techniques include containment, solidification and encapsulation. Containment techniques include placing the contaminated materials into barrels or other larger containment structures including concrete vaults. Solidification techniques use the physical immobilization of contaminated wastes by incorporating the waste into a solid matrix with enhanced physical strength. A common solidification method combines the waste with Portland or magnesium cement-based materials to form a slurry that hardens after a period of time due to the three-dimensional network of interlinked calcium silicate hydrates. Phosphate ceramic forms of solidification also exist as well as sulfur polymer cement for the stabilization of mercury contaminated waste. (Wagh et al., "Mercury Stabilization in Chemically Bonded Phosphate Ceramics", EPA Workshop on Mercury Products, Processes, Waste and the Environment, March 2000, Baltimore, Md.) The sulfur polymer cement technology combines chemical and solidification treatments by using powered sulfur and polymerizing additives that are mixed at room temperature and heated until the mixture melts—the product is mercury sulfide encapsulated in a sulfur polymer matrix. (U.S. Pat. No. 6,399,849). Encapsulation is the physical immobilization of hazardous materials by enveloping a waste in a non-porous, impermeable material. If the waste is fine-grained and well dispersed throughout the encapsulation matrix so that each particle is separately encapsulated, it is microencapsulated. If clumps of the waste matrix or bulk waste are enclosed within the encapsulating material, the waste is macro-encapsulated. (Jackson, Mixed Waste Treatment at Envirocare of Utah, Inc., WM2000 Conference, February 2000, Tucson, Ariz.).

One study was performed that used GAC, PAC, and fine activated carbon as adsorbents to treat/adsorb mercury in soil and pore water. The batch testing demonstrated that the reactive surface area of the PAC was the primary driver that controlled the PAC's effectiveness to adsorb mercury, and concluded that dissolved organic matter competed with mercury for the available surface area adsorption of the PAC. (Bessinger et al., "Treatment of Mercury-Contaminated Soils with Activated Carbon: A Laboratory, Field, and Modeling Study", Remediation, Winter Volume, 2010.) This study was conducted using site soil with total mercury concentrations that ranged from 50 to 170 mg/Kg and leachable mercury concentrations ranging from 2.5 to 34.2 ug/L—very low levels of mercury contamination that did not include elemental mercury. The present technology disclosed herein uses an acid and oxidizer in combination with an adsorbent (e.g. carbon) to treat wastes with high levels of mercury contamination including elemental mercury and as shown in Example 1, Table 2 later in this specification, GAC alone was not capable of reducing the leachability of mercury.

Two additional studies were completed using sulfide impregnated reactivated PAC. The studies showed that PAC with sulfide was effective in stabilizing mercury in the waste surrogate with mercury concentrations of 1000 mg/Kg. The PAC was then also encapsulated with Portland cement. The studies concluded that the stabilization/solidification process using reactivated carbon, sulfide, and cement to be a robust and effective technology for the immobilization of high mercury wastes. (Zhang et al., "Stabilization/Solidification of Mercury-Containing Wastes Using Reactivated Carbon and Portland Cement", Journal of Hazardous Materials, Volume 92, Issue 2, 27 May 2002, Pages 199-212.) (Zhang et al., "Stabilization/Solidification of High Mercury Wastes with Reactivated Carbon", Practice Periodical of Hazardous, Toxic and Radioactive Waste Management, Volume 7, Issue 1, January 2003.) The present technology generates an end-product that will allow for the removal of contaminants from water that contact it. Other technologies that teach the use of cement, clays, minerals and other such additives with an adsorbent like GAC create non-reactive solidified material, if not a mass of low-permeability, will reach a treatment terminus due to solidification and curing. This, coupled with sealing or blocking the of the pore structure of carbon with additive fines, can prevent permeation of contact water, and the hosted contaminants carried by the fluid from being removed by the treated mass. Thus, proper treatment can be easily compromised, particularly for PFAS where treatment objectives are in the parts per trillion concentration range.

While prior approaches to mercury remediation may be effective in some situations, they have a number of drawbacks. For example, thermal methods generate elemental mercury with severe reuse/disposal options and significant energy requirements. Some chemical techniques expand the end-product treated mass and volume by the incorporation of hydrated water and the amounts of solid reagent and water added. The sulfur polymer cement technique is quite costly and was developed for use on radioactive mercury waste. Techniques that utilize phosphate-bonded ceramics or other resins to physically retain soluble mercury within the additive matrix or media component, and, as such, are quite complex. And some of the chemical techniques require the addition of multiple reagents to control mercury solubility, interferences from various species (e.g., iron) found in the waste material or soil, and pH in the neutral to alkaline range, using lime, calcium-based hydroxides or carbonates. Accordingly, there remains a need for safe and effective methods for addressing the management and disposal of historic mercury contamination found in soil, solids, and other materials, and new contaminated sites as they are identified.

Preferred treatment remedies typically revert to cement and/or other pozzolanic agents, which are not only costly but also contribute significantly to waste volume and mass expansion, and create an end-product prone to long-term deleterious effects from prolonged exposure to acidic and other conditions typically found in landfill, conditions that neutralize the alkaline metallic-hydroxide species and degrade the physical immobilization properties of the treated material.

Other technologies that are selected to treat heavy metals are typically based on performance for RCRA metals in general, and are often limited in their ability to reduce long-term leachability of all metals, and especially those hazardous metal substances that are not subject to RCRA regulation under the toxicity rule for hazardous waste. Examples, such as manganese, copper, zinc, and others are either non-reactive to these technologies or subject to mobilization when exposed to acidic conditions.

There is a substantial need for a method for retaining leachable PFAS and other contaminants in waste material disposed in landfills or left onsite at its source. In particular, if a PFAS-bearing waste is altered to retain leachable PFAS when disposed in a landfill, that material should minimize PFAS release and subsequent risk to landfill owners and operators. An ideal solution would yield treated solid waste that is stabilized against contaminant leaching as well as being capable of removing PFAS from fluids that come in contact with the treated waste when disposed in the landfill, such as percolating fluids within an interned waste, or landfill leachate.

SUMMARY OF THE INVENTION

The present invention provides a set of reagents and a method for reducing the leachability and release of PFAS, mercury, other metals, and other contaminants from soils, sediments, and other solid waste when treated materials are exposed to (e.g.) acid rain, snow melt, runoff, landfill leachate, groundwater, or the like. In a first aspect of the invention, a reagent set includes an acid, preferably nitric, sulfuric, and/or phosphoric acid; an oxidant, preferably nitric acid, hydrogen peroxide, and/or a persulfate; and an adsorbent, preferably granular and/or powdered activated carbon. In a second aspect of the invention, a method of reducing the leachability of a contaminant from a solid material entails admixing contaminated material with the reagents and adding water as needed, typically in an amount of 5-10% by weight of the contaminated material.

By reducing the leachability of metals, PFAS, and other contaminants over prolonged periods, the present technology provides economically viable waste management solutions for reducing and mitigating the release of such contaminants into the environment from source areas, spill and manufacturing sites, impacted media, and solid waste landfills. Furthermore, the presence and behavior of heavy metals, PFAS, or other contaminants within the actual site fluid can be evaluated as a result of contact with the treated material, with one benefit being that the treated material itself will be capable of removing contaminants from the fluid, thus enhancing the quality of site waters. Consequently, the invention provides landfill operators with reagents and methods for treating not only new shipments of contaminated solid waste, but also contaminants already present in existing landfills. Interning invention-treated material with other landfill waste, such as solid waste capable of leaching PFAS (e.g., fabric, carpets, household/commercial product remnants and remains), will address PFAS migration from such materials and waste. Ideally, impacted solid material that can leach its contaminants will be brought into compliance with various statutes and regulations, including RCRA and related EPA directives, guidelines, and advisory limits relating to a variety of water quality standards, and in particular, those founded in drinking water quality, as well as land disposal and waste management such as the Comprehensive Environmental Response, Compensation, and Liability Act (CERCLA), Safe Drinking Water Act (SDWA), Clean Water Act (CWA) and other federal and state laws and regulations as applicable.

BRIEF DESCRIPTION OF DRAWINGS

Various features and embodiments of the invention will be understood more fully when considered in conjunction with the appended drawings (which are not necessarily drawn to scale), wherein.

DETAILED DESCRIPTION

Figure 1:
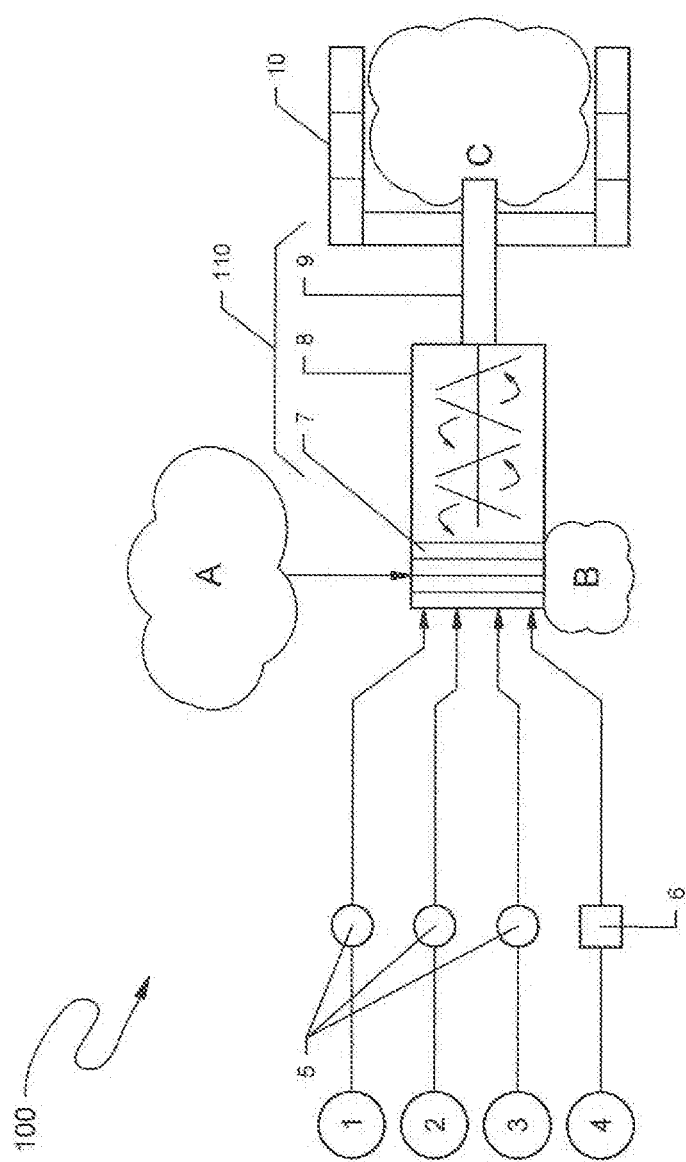
FIG. 1 is a schematic illustration of one embodiment of the invention in an ex situ application showing individual addition of reagents and soil into a mixing unit, where oversize material is removed from the solid waste stream prior to contacting the reagents in a blending chamber where a uniform admixture is produced.

The invention utilizes water and a reagent set including acid, oxidizer, and adsorbent (also referred to as adsorbent media) to reduce the leachability of hosted constituents such as PFAS, mercury, and other contaminants found in soil and other solid waste that are often non-reactive, migratory, chemically stable, and/or persistent. Each reagent is important to the present invention.

Water

Water functions to enhance mixing and to ensure intimate contact between the contaminant molecules or particles and the adsorptive media, and where acidity caused enhanced activation of the media, as well as to enhance the solubility of the contaminants so that they can physically move more easily through the host matrix, additives, and reagents during mixing. In general, the water content of the host matrix, pre-treatment, will dictate the amount of water to be added during treatment. The amount of water to be added is not dependent upon hydration reactions common to cement, kiln dust, fly ash, or the like where agglomeration is facilitated. It is also noted that high pH is to be avoided, as contaminants tend to desorb from activated carbon and similar media at elevated pH.

Water within the soil or other solid waste and the reagent system is critically important. Water enhances contaminant-reactant-adsorbent interactions; serves as a particle-to-particle lubricant; extracts and mobilizes soluble species from within and on surfaces of waste matrix particles, micelles and within interstitial spaces along with species attenuated and solubilized by the reagent system; serves as a carrier agent of soluble contaminant species; provides for fluid dispersion of contaminants and reactants through the host solid matrix; minimizes air space within adsorbent media pores and pore networks (thus increasing available pore surface areas for contaminant adhesion sites); and facilitates movement and dispersion of eroded adsorbent media particles throughout the matrix. In some embodiments, the soil or other solid waste that is to be treated may have adequate soil moisture per se. If not, supplemental water can be added directly to the soil or via the reagents prepared for use. Excess water should be avoided to prevent free liquids, and loss of reagents with migratory fluid, and to help control desirable geotechnical properties of the end-product material. While water does facilitate motion and improve mixing of reagents with contaminants, physical mixing is also required.

The amount of water to be added depends on the characteristics of the material to be treated. Extremely dry material will require more water, and fully saturated sediments or slurries, for example, may not require any water to be added. For typical soils, a representative moisture range is 5-12% by weight. For excessively wet and saturated materials, such as sludges, slurries, and sediments, facilities should be designed to stage treated material for containment purposes and to allow it to drain and dry. In a severe-case, high level water content situation, the waste material could be dewatered prior to, or after, treatment using gravity or mechanical dewatering. In such cases, treatability studies performed by those skilled in the art will help optimize reagent dosing and assess process cost with respect to where and how operational dewatering would be most economically and productively performed.

In all processing cases, excess water beyond what is needed can unnecessarily dilute the reagents relative to the density of the waste material (and thus the contaminant concentrations), and could potentially compromise the leachability of contaminants from the end product. Excess water will also increase the mass of the treated end-product (and increase the cost of handling the end product) as well as create free liquids that are regulated with respect to material disposal at licensed landfill facilities, making management and handling of the treated material difficult and problematic. Conversely, providing too little water will prevent the reagents from adequately contacting the contaminants and may compromise the desired results.

In a preferred embodiment of the present technology, water is added with reagents at a dose rate of 5-15% by weight of the contaminated material; however, this may be altered based upon the consistency or heterogeneity of the untreated material, its ability to release free liquids, its stackability, often evaluated by slump testing, and/or other physical properties related to material handling and management.

Acids and Acidity

A number of acids are suitable for use in the practice of the present invention, with the three most preferred being nitric, sulfuric, and phosphoric acid. These may be of any commercially available grade and purity, and used in concentrated or diluted form as the water content of the waste being treated may dictate to avoid the generation of free liquids from the treatment end product. Nitric acid is especially preferred because of the acidity it provides to the treatment process reactions as well as its ability to act as the oxidant in the reagent set. Other examples of compounds that can function as both acid and oxidant include sulfuric acid, peroxydisulfuric acid, and peroxymonosulfuric acid, and other acids. In one embodiment, the acid component is phosphoric acid, which is generally recognized as a poor oxidizing agent (as compared to nitric acid and sulfuric acid).

Other acids, for example hydrochloric acid, citric acid, acetic acid, peracetic acid, are alternative choices, especially if treatability and optimization studies are conducted to ensure that the acid's conjugate base does not interfere with other aspects of the present invention, including interferences and problematic interaction with various constituents and characteristics of the material being treated. Hydrochloric and hydrobromic acids are not preferred, however, as their halide anions can adversely interact with organic compounds often found in soil, sediments, and other contaminated materials. They also could reduce the affinities between the contaminant(s) and the adsorbent component of the reagent system. In one embodiment, acidity is provided from a solid mineral acid such as iron carbonate (siderite), which may also provide an oxidation benefit in some conditions.

Combinations of acids can be used, provided that the acids are chemically compatible when combined prior to addition to the waste, or to the waste directly and individually.

The acid component of the invention provides several functions and benefits. The acid can serve to: further enhance the adsorbent component's adsorbency by opening the pore space and pore networks within the adsorbent particles (e.g. carbon); prevent fouling of the pore spaces that can result from soluble-hardness-causing properties in the soil where metals (e.g. calcium, magnesium, etc.) and other scalents can precipitate in various forms in alkaline conditions; solubilize contaminants to more leachable forms, thereby facilitating migration of the contaminants through the solid/soil matrix, which results in a higher contact rate with the adsorbent particles' surfaces; degrade organic matter within the soil matrix and thereby free up adsorbent pore spaces for the contaminants of concern; and generate a large number of surface functional groups such as carboxyl, carbonyl, and nitrate groups.

In general, the choice and amount of acids(s) are selected such that the reagent imparts a pH in the range of 3.5 to 7.0 standard units (S.U.) when added to the material being processed. However, for many applications, an acidic pH in the range of 3.5-4.5 S.U. should produce better contaminant retention results due to surface charges of the contaminants and the adsorptive surface of the adsorbent, i.e., the effects of Van der Waals forces at the molecular level. When diluted acids are used, care must be taken to avoid the addition of water to concentrated acids. Instead, the concentrated acid is added to water, with stirring, to avoid rapid heating and splashing or bumping. Also, when mercury is a contaminant of concern, the mixing of acid and water requires consideration of thermal effects. When acid is added to water, the acid will disassociate, exothermically. Mercury will volatilize at elevated ambient temperatures. As such, reagent choice, dosing, and mixing methods should take into account the possibility of mercury release. Appropriate safety measures may be required where processing is performed in a contained area. Such measures may include, for example, adequate air capture and scrubbing, using vapor phase activated carbon, suitable ventilation/air moving devices, or other controls.

In one embodiment, the pH of the treated end-product is 4.0-6.5, particularly when material will be disposed in a landfill. In another embodiment, when processed material is managed on site, the treated end product has a pH in the range of 5.5-7.5. Treatability study results will allow for optimized acid selection, dilution options, dosing, and end-product pH with respect to final disposition of the treatment end-product. Because of variability in a solid material's buffering capacity, for example sand vs. soil with high limestone (calcium carbonate) content, acid dosing is preferably based on the strength of the acid instead of the quantity of acid utilized.

Oxidizer

One or more oxidants are used individually or in combination, provided that the combination is chemically compatible with each other, the acid, and the material to be processed. Preferred oxidants are nitric acid, hydrogen peroxide, and persulfates and peracetates. As noted earlier, acids such as nitric, sulfuric, peracetic, peroxydisulfuric, and peroxymonosulfuric provide the dual benefits of providing acidity and functioning as oxidants.

The oxidizer provides several functions. It can alter contaminant valence states to more soluble forms and alter the length of long chain contaminants to shorter, more soluble species and/or oxidized states that can more readily adsorb to the internal pore spaces and pore network surfaces of the adsorbent. Oxidizers also enhance the activation of carbon pore spaces and networks by attacking oxidizable organic matter that may otherwise block or fill pore networks that are of reduced size and connectivity.

Table 1 provides a non-limiting list of oxidizers.

TABLE 1

Representative Oxidants and Oxidation Potentials (Volts)

| Oxidant | Oxidation Potential (V) |
| --- | --- |
| Fluorine ($F_2$) | 3 |
| Hydroxyl radical-acidic pH (•OH) | 2.8 |
| Sulfate radical (•$SO_4^-$) | 2.6 |
| Singlet (atomic) Oxygen (•O) | 2.4 |
| Ozone ($O_3$) | 2.1 |
| Persulfate ($S_2O_5^-$) | 2.1 |
| Ammonium Persulfate (($NH_4$)$_2S_2O_8$) | 2.1 |
| Sodium Persulfate ($Na_2S_2O_8$) | 2 |
| Hydroxyl radical-neutral pH (•OH) | 1.8 |
| Peroxymonosulfate ($HSO_5^-$) | 1.8 |
| Hydrogen Peroxide ($H_2O_2$) | 1.8 |
| Peroxyacetic Acid ($CH_3CO_3H$) | 1.8 |
| Carbonate radical (•$CO_3^-$) | 1.8 |
| Perhydroxyl radical ($HO_2$•) | 1.7 |
| Sodium Percarbonate ($C_2H_6Na_4O_{12}$) | 1.6 |
| Sodium Hypochlorite (NaOCl) | 1.5 |
| Hypochloric Acid (HCl) | 1.5 |
| Chlorine dioxide ($ClO_2$) | 1.5 |
| Chlorine ($Cl_2$) | 1.4 |
| Oxygen (O2) | 1.2 |
| Nitric Acid ($HNO_3$) | 0.96 |
| Hypochlorous Acid (HOCl) | 1.61 |
| Hypochlorite ($ClO_2^-$) | 0.89 |
| Chlorite ($ClO_2$) | 0.78 |
| Acetate ($C_2H_3O_2$) | −0.6 |

Alternative oxidants include peracetic acid and the peracetate radical; ferrous (Fe(II)) and ferric (Fe(III)) cations, and zero-valent iron (ZVI), in the form (e.g.) of nanoparticles, micro particles, fines, filings, granules, or flakes. Another oxidant choice is mixed oxidants generated at the contaminated site using (e.g.) an electrolytic system to produce hydroxyl radicals, persulfates, percarbonates, peracetates, and/or other species using water, landfill leachate (in the case of peracetate), and other precursor reagents.

In some embodiments, it is advantageous to admix the oxidant with the contaminated material separately, followed by the acid and the adsorbent. Upon addition of the oxidant and thorough mixing with the target mass being processed, the Oxidation/Reduction Potential (ORP), i.e., the ability of a material to exchange electrons, should minimally exceed +200 mV, and preferably 500-650+ mV the ORP value of untreated material, depending on the contaminant and host matrix characteristics. Higher organic matter content, for example may require a greater positive span ORP mV to overcome the competition for electrons, and thus the need for a higher concentration of oxidant in the reagent set of the present technology.

Adsorbent

Adsorbents generally have large external and internal areas that attract contaminant molecules, atoms or ions, which adhere to the surface walls of the pore structures due to surface energy between the contaminant and the adsorbent. Adsorbency is related to covalent bonding and electrostatic charge attractions, where the contaminant remains within the adsorbent media, and the carrier water, alleviated of its contaminant, can pass through the pore network. In contrast, absorbents are media types with large external and internal voids that are permeated where the voids of the pores are filled by the fluid (which also contains the contaminants) retained within the void space. Physically, an absorbent acts like a sponge and therefore, the contaminants can be released from the void spaces along with the pore water. As such, absorbents per se are not preferred.

A preferred adsorbent (also referred to as adsorption media) is carbon, especially activated carbon, which can be produced from coal (anthracite or lignite), coconut, or nutshells, for example. Biochar may also be a suitable adsorbent, but typically less preferable due to having less developed internal pores and pore networks and its propensity for releasing contaminants. While coal-based carbon is the most preferred adsorbent, a cost vs. performance analysis should be evaluated against other carbons, such as coconut and/or regenerated forms. Lignite coal carbon is also worth consideration; however, it should also be evaluated for cost and performance as the sulfur in this carbon type could compromise performance desired by the technology. With respect to PAC or GAC selection, particle size, thus carbon type, may facilitate treatment performance related to the properties and particle size of the soil, as well as contaminant and carbon affinity.

Other adsorbent choices include alumina, activated clays and organoclays, graphite and/or graphene, zeolites, ZVI, cenospheres, ion exchange resins, and various ceramics and other materials that have large internal surface areas. Lignite, while a soft carbon, contains sulfur and may provide added advantage despite its reduced active surface relative to bituminous/anthracite-based carbon, where the sulfur has added affinity to mercury.

The function of the adsorbent in the present invention is to adsorb contaminants in the soil or solid matrix after the acid and/or oxidizer have mobilized the contaminants within that matrix. In a preferred embodiment using activated carbon, the media is not back flushed to remove fines. The presence of fines will increase the surface area of adsorptive media particles on a total media mass basis, and allow for less impeded migratory movement patterns when the adsorbent material is mixed with the host matrix and constituents.

In some embodiments, the adsorptive media is activated to increase the surface area of each media particle by creating micropores. Activation can be achieved with heat, steam, acidity, oxidation, dehydration, and other means. In one embodiment, pre-activated, commercially available adsorption media are employed, but enhanced activation will also enhance technology performance. In particular, nitric acid can be used as an activator and it functions both as an acid and as an oxidizer. Phosphoric acid in combination with an oxidizer can also activate carbon adsorbency, as phosphoric acid has the benefit of apatite formation for various metals that will also adsorb to media, and it facilitates chemical dehydration.

Adsorbent particle size may be selected to accommodate various properties of the solid material being treated, such as the nature of the soil, soil micelle size, silt and fine content, and the natural attenuation sorptive properties of the host material and the contaminant(s). Hence, the adsorbent(s) can be powdered, granular and/or prilled. For activated carbon, the terms "powdered activated carbon" (PAC) and "granular activated carbon" (GAC) denote activated carbon of various particle sizes, namely, powdered activated carbon (PAC) particles are those that pass through a 80-mesh screen with an opening of 0.177 mm (0.0070 in), and granular activated carbon (GAC) particles range in size from 0.177 mm (80 mesh) up to 2.4 mm (No. 8 mesh). GAC particles can be further graded within that range by mesh size.

In a preferred embodiment, the adsorbent is GAC, applied at a dose rate of 0.5 to 5% by weight for mercury treatment, and 1 to 10% by weight for PFAS treatment.

Exemplary Reagent Sets

A number of reagent combinations according to the invention are preferred for reducing the leachability of contaminants from soil and other solid waste. Nonlimiting examples include: (A) nitric acid-based, e.g., A1: nitric acid and activated carbon, with nitric acid functioning as acid and oxidant; A2: nitric acid, hydrogen peroxide, activated carbon; A3: nitric acid+phosphoric acid, hydrogen peroxide, activated carbon; (B) phosphoric acid-based, e.g., B1: phosphoric acid, hydrogen peroxide, activated carbon; (C) acetic acid-based, e.g., C1: acetic acid/peracetic acid, peroxyacetate and/or hydrogen peroxide, activated carbon (good for treating landfill leachate); and (D) sulfuric acid-based, e.g., D1: sulfuric acid, persulfate/persulfate radical and/or hydrogen peroxide, activated carbon. Reagent sets can be provided in combined (pre-blended) form, with some or all reagents present, or made on site by adding the reagents individually, in pairs, etc., to the contaminated material.

In one embodiment, for the remediation of mercury from contaminated solid material, a preferred reagent system includes phosphoric acid, hydrogen peroxide, and PAC or GAC, where nitric acid may, alternatively, be substituted for phosphoric acid. An example of the dosing (wt. %) of reagents to solid mass of the target material is 3% phosphoric acid (technical grade), 1-10% PAC, and 0.5-1% of 35-50% hydrogen peroxide, where the activated carbon is enhanced with the acid prior to addition to the soil (or other solid waste) that has been amended with the oxidizer. This system is also a preferred reagent system for reducing the leachability of PFAS from soil where the oxidant is dosed to some degree based on the total organic content of the soil or other target matrix. For example, biosolid targets will require more oxidant than a loam soil type, which will require more than a sandy gravel target.

In one embodiment, the reagents include GAC and phosphoric acid, which are pre-blended and then added to the target host material for full admixture blending. The pre-blended carbon and acid, when added to the target material, results in a final pH of approximately 4-4.5 S.U., with an adequate amount of adsorbent media to remove and retain contaminants of concern on a mass-to-mass basis, with supplemental water provided to facilitate active migration of the contaminant species throughout the target material and intimate contact with the media during processing, where the oxidant is added to ensure desorption of the contaminants from the host species to a soluble, readily adsorbable form.

While not bound by theory, it is believed that the process does not rely on chemical reactions where reactants undergo chemical change, with the exception of oxidation/reduction of organic material or multivalent metals. Instead, the process harnesses the physical attraction to surface areas caused by particle and molecular charges, i.e., the adhesive forces between the targeted contaminant(s) and the adsorption media surface. The reagents that are utilized enhance the process by increasing the availability of the contaminant species and the adherent activity of the media surface, and thus the retentive attractions between the media and the contaminant to overcome robust physical abrasion and exposure to acidic conditions, such as acid rain, drainage, or leachate.

Unlike conventional treatment technologies, the present invention does not rely on the formation of insoluble mineral species or the formation of metallic hydroxides. Further, and while an oxidant is required for the present technology, oxidation that leads to destruction or alteration to a new species, is not an objective of this method.

Mixing

Non-limiting examples of mixing approaches and equipment include pugmills, batch mixers, in-ground mixing cutter heads and shrouds, ribbon blenders, and cement trucks with tub mixers. Solid reagents may be provided in bulk for silo storage and dispensing, paper bags for smaller projects, etc. Liquid reagents may be stored in tanks, drums, etc., or pumped to the mixing location. Blending can be carried out in tanks or using power blenders with as needed grinding or milling on or offsite.

As noted, in another aspect of the invention a method is provided for treating contaminated material to obtain a product having reduced contaminant leachability. The method includes the steps of (a) admixing the contaminated material with a reagent comprising oxidant, acid, and adsorbent; and (b) adding water as needed, e.g., in an amount of 5-10% by weight of the contaminated material. The contaminated material can be provided as a dry solid, a moist solid having a moisture content of up to 60% by weight (for example, contaminated soil), a sediment, sludge, or slurry having a solids content of at least 5% by weight, or the material may have some other physical form or an aggregation of forms.

The reagents can be applied to and mixed with soil or waste either as separate and distinct components, with acid added separately from oxidant and/or adsorbent, adsorbent separately from acid and/or oxidant, etc., or as a reagent blend comprised of the various components of a reagent set. In some embodiments, the adsorbent is provided in dry form. Alternatively, it is added as an aqueous slurry, optionally containing the acid and/or oxidant therein. If any of the reagents are added as a slurry (or as individual slurries), the water contained therein can be sufficient, with no additional water needing to be added to treat the contaminated material.

Figure 2:
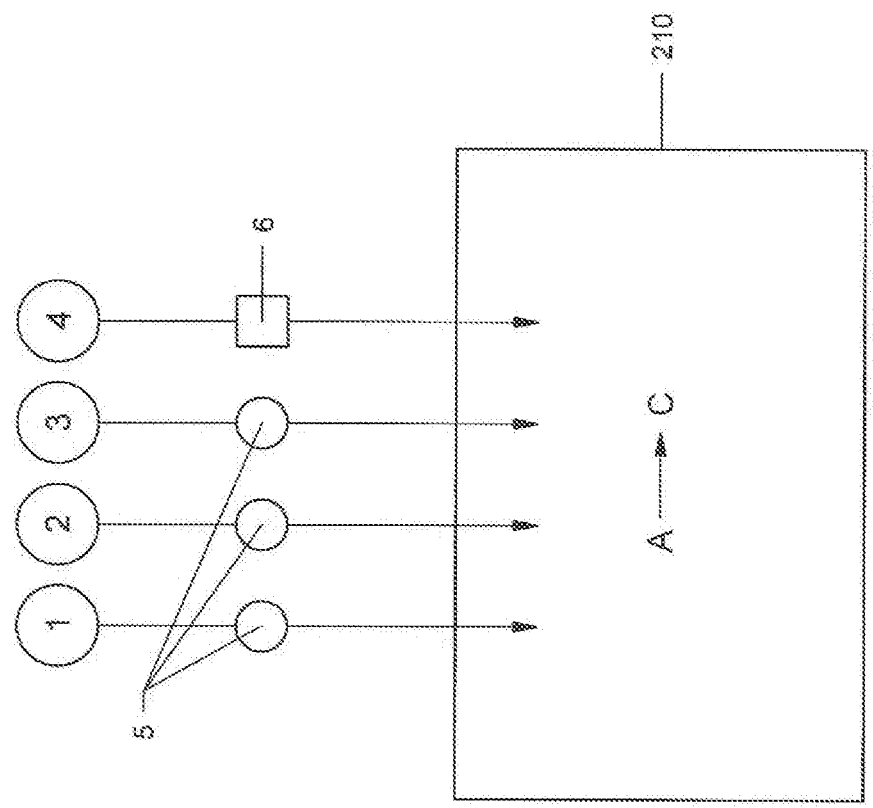
FIG. 2 is a schematic illustration of one embodiment of the invention in a simple in situ application where individual reagents are added to soil, where soil and reagents are blended to a uniform admixture.
Figure 2:
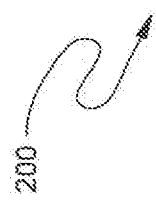
Figure 3:
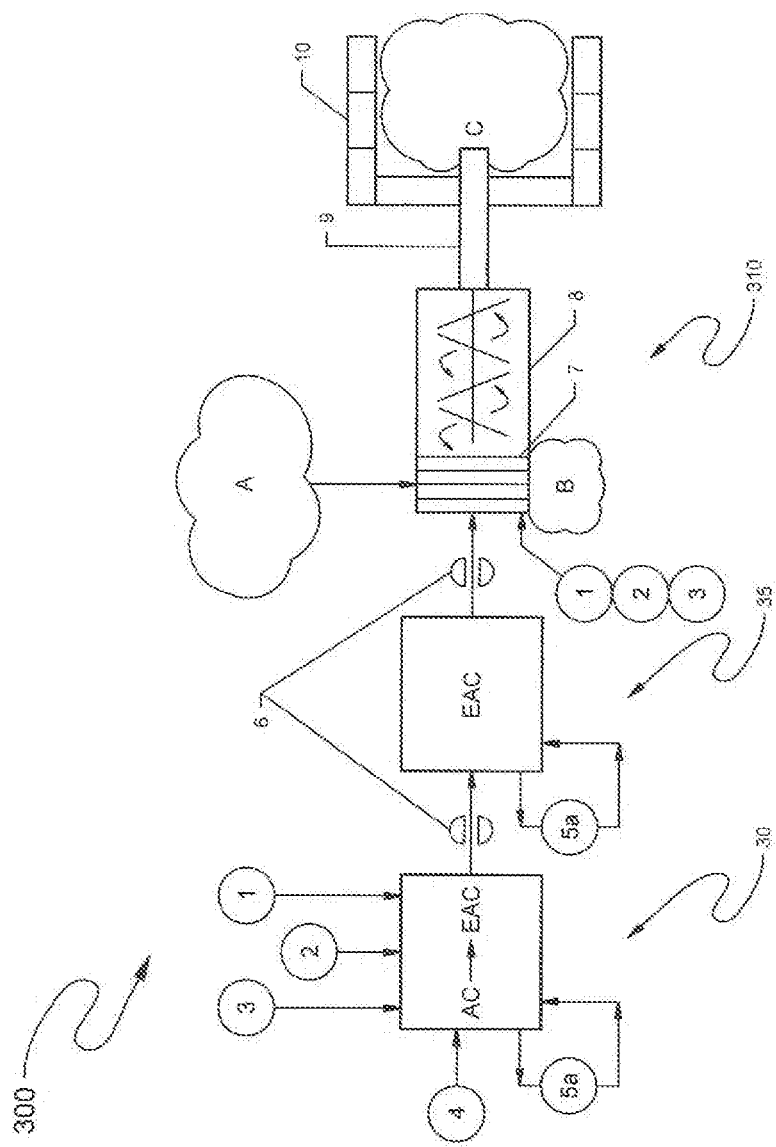
FIG. 3 is a schematic illustration of one embodiment of the invention in another ex situ processing application, where reagents are prepared prior to their introduction to screened soil and subsequent blending within the mixing unit.
Figure 4:
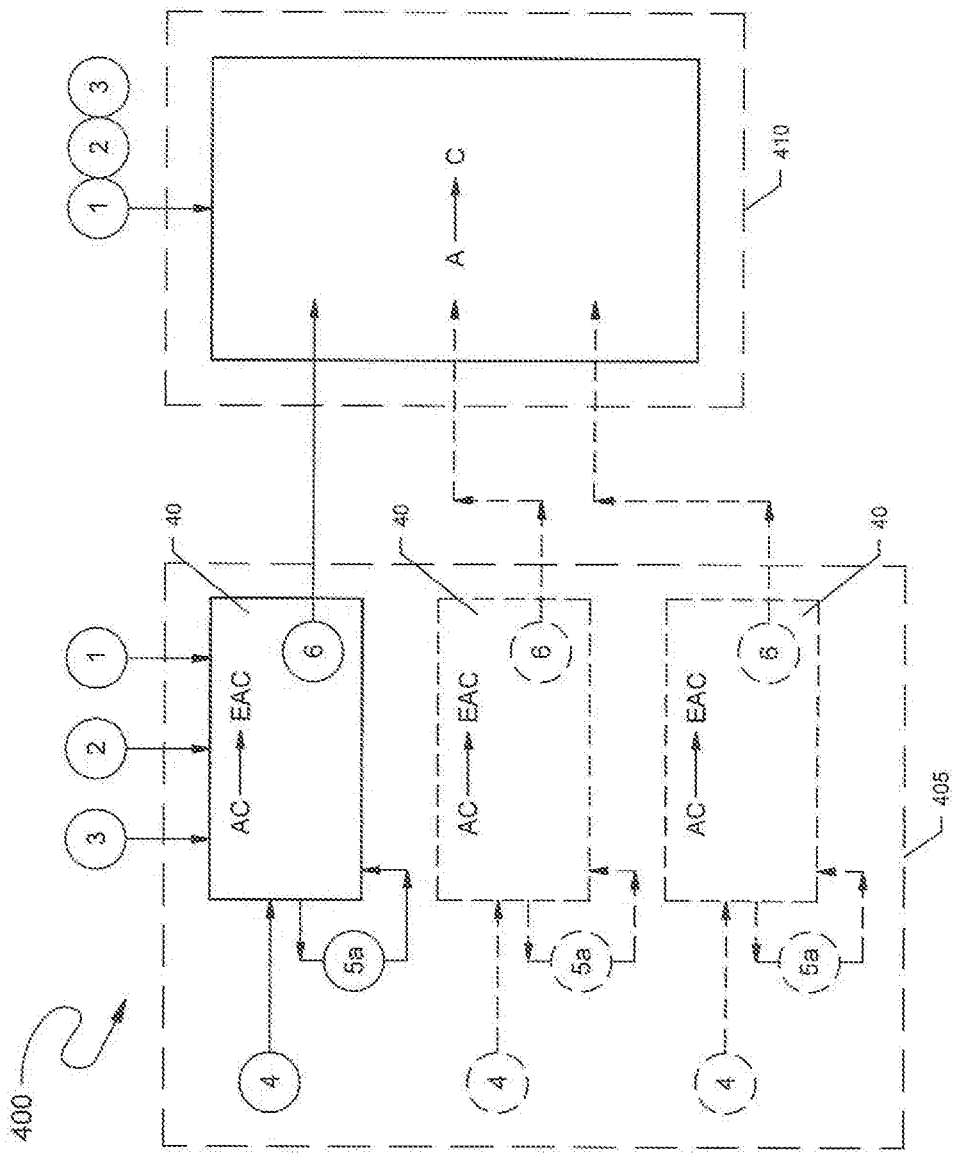
FIG. 4 is a schematic illustration of one embodiment of the invention where reagents are prepared in a batch operation singularly, or in batch plurality, prior to their addition to soil for in situ mixing.

Individual reagent additions are shown in FIGS. 1 and 2 and a blended reagent addition is shown in FIGS. 3 and 4. For individual reagent additions, reagent dosages are discussed in various examples described herein. For a blend of reagents added to soil or waste, a preferred reagent blend dose rate for treating leachable mercury is in the range of 1-8% by weight, based on the weight of the untreated soil or waste. Where PFAS-contaminated material is the target, somewhat higher amounts of reagents are used in a preferred embodiment, e.g., 4-25% by weight, including water, based on the weight of the untreated soil or waste. Water is highly important for treating low part per trillion (ppt) concentrations of leachable PFAS.

Measured quantities of each reagent can be added to a mixing container or tank, and makeup water added to prepare the desired reagent solution concentration. Heterogeneous mixing and suspension of the reagents with the water can be achieved by spindle, paddle, or other suitable mixers in the tank, or by pump recirculation. A pump can also be used to deliver the reagent fluid to the waste in a waste-reagent mixer based on predetermined dose requirements for batch mixing, or flow rates based on continuous mixer waste feed rates.

In another highly effective reagent delivery method, dry reagents can be added at the proper ratio to the mixer via gravity feed from silos or elevated super sacks. Reagent addition rates can be controlled via weigh cells integrated with off-loading silo augers or conveyor belts. Super sacks can be held with a front-end loader or excavator equipped with a suspended scale system, load-cell, or integrated with the equipment bucket hydraulics. In a simple delivery method, prepackaged bags of reagents of known mass can be added to the mixer manually. With these types of reagent deliveries to the waste and mixer, water is added, preferably in the form of mutually beneficial misting sprays that also mitigate dust from the contaminated material and reagent during treatment blending and mixing operations.

For many contaminants, to ensure that the reagent system contacts the contaminant(s) in the material being treated, robust physical mixing of the waste with the reagents and water is employed. High shear mixing in a batch mixing chamber is preferred where mixing intensity and retention time during mixing will enhance treatment results, particularly where mercury is a substantial contaminant. Not only will reactants and mercury be more apt to be put in close contact with each other, but the particles of the waste coupled with the mechanics of the mixing blade shear cause elemental mercury droplets to break apart into units of higher surface area, increasing reactivity. Droplets of elemental mercury are highly mobile as a result of gravity and mechanical forces. The grinding of waste particles and abrasion caused by aggressive mixing will serve to break up mercury droplets while keeping them uniformly suspended within the waste mass for reaction. Without high shear or robust mixing, mercury droplets could settle out of the waste mass and/or potentially agglomerate into larger, extremely dense droplets, even to the point of a recoverable free liquid. In such conditions, settled mercury would fall outside of the physical reach of mixer paddles, preventing robust mixing. With high shear or similarly robust mixing, the combined surface area of the droplets increases, thus increasing the ability for mercury-reagent contact and reaction. The robust mixing is best performed in a batch process where the mixing shaft, paddles and blades are controllable with respect to the rate and direction of rotation and overall retention within the mixing chamber. Reversal of the mixing shaft assembly will allow for prolonged mixing that may require up to 15-20 minutes for adequate mercury-to-reagent contact for the desired reaction to proceed to a desired end point.

Other continuous feed discharge-type mixers such as pugmills or brick mixers may also be appropriate to achieve desired mixing requirements; however, such equipment tends to offer process operators less flexibility to accommodate waste material properties and process reactions variables. Batch mixers are also more capable of handling high water content in the material being treated. As water content increases, the reactants are more likely to permeate various particles of waste and debris carrying with it the reactants to contact with mercury. Batch mixers are designed to handle higher water/fluid content materials than pugmills or continuous flow-through mixing units. Crushed concrete and bricks are prime examples of target material that may contain mercury within its interstitial spaces, where higher water content and increased mixing time will improve the treatment of mercury within the contaminant matrix. When such debris types or particle sizes are encountered, the applicator of the technology may choose to pre-screen the material to remove larger objects that might damage the mixing equipment, as well as any oversized materials not conducive to reagent penetration.

Elemental mercury droplets are heterogeneous throughout soil-like waste, given its fluid nature, high density, and ability to combine into large globules, or to break-down to nearly invisible droplets. Mixing is essential to enhance the uniformity of mercury throughout the waste and replicate the uniformity of reagent dispersion through the matrix. Simple, single-pass-through mixing equipment may not provide sufficient mixing to achieve the desired remediation. PFAS-impacted soil also requires intense and robust mixing to ensure part-per-trillion concentrations of PFAS are freed within the soil and in condition to interact with the reagents.

In another delivery and mixing method, rotating augers and cutter heads may be used to vertically mix technology reagents in vertical soil columns, from the ground surface down to the bottom elevation of the contaminated soil vertical limits. Overlapping columns (secant) will produce the most uniformly mixed material horizontally across a project site, with reagents delivered down the drill or Kelly shaft and outward to the mixing blades from the vertical shaft center line to the extent of their outer diameter cutting and mixing path. Such in situ mixing equipment is designed to deliver reagents and mix them with materials to be processed. The reagents and methods of the present invention, and the reaction chemistry, are well suited for in situ application to mercury contaminated material using this common type of construction equipment, provided however, that subsurface obstructions and anomalies are identified and managed prior to the start of treatment or when encountered.

FIGS. 1-4 are schematic illustrations of different embodiments of a method of remediating contaminated soil (or other solid material), in situ or ex situ, where specific soil amendment reagents—acid, oxidizer, and activated carbon—are introduced and blended with the soil blended to produce an end product hosting target contaminants of reduced leachability.

Nonlimiting examples of a method of remediating contaminated soil according to the invention are schematically illustrated in FIGS. 1-4. In FIG. 1, the contaminated material is processed ex situ; the material has been excavated or staged prior to its processing. In FIG. 2, the contaminated material has not been excavated and is instead processed in situ, either on grade or near surface lifts. For methods illustrated in these figures, the reagents are introduced individually in amounts and relative proportions with sufficient admixing to lower the leachability of various contaminants in soil, sediment, or other solid waste.

Referring to FIG. 1, an ex situ treatment system 100 includes a pugmill mixer 110. Separate reagents 1-4 are selected for use and delivered by dosing pumps 5 and a slurry delivery pump 6 to the mixing unit 110 beneath one or more screens or grates 7. Material to be treated, i.e., soil A, is dropped onto the screen(s) 7 from above so that the screen(s) remove large objects B that could damage the mixing unit 110 and its mixing chamber 8 and discharge conveyor 9. To minimize excessive use of reagents 1-4, they are individually applied to screened material after oversized material removal by the screen 7. Blending the reagents 1-4 and soil (A minus B) in chamber 8 will generate an admixture that is transferred by a screw or belt conveyor 9 from the mixing system 110 to a treatment end-product stockpile C that is received in a controlled staging area (depicted in FIG. 1 with containment sidewalls 10. Alternative berming and a recommended durable floor to prevent migration of the material and ease subsequent end-product handling by heavy equipment are not shown.

Water 1 and the reagents—acid 2 and/or oxidizer 3—are provided in tanks, drums or other containers from which they can be metered and dosed to the mixing chamber 8 using feed pumps 5 after the soil has been screened. Acid 2 and oxidizer 3 can be applied in dilute or concentrated forms with water 1 added to achieve appropriate dosing and so that end-product material does not contain excess free liquids or insufficient fluid addition that prevents mixing of soil and reagents in the mixing chamber 8 of the mixer 110. Activated carbon 4 is supplied to the mixing unit 110 as a slurry by pump or educator 6 after oversize material B is scalped from the feed soil A. Selection of the reagents—acid 2, oxidizer 3, adsorbent media 4—is dependent upon characteristics of the untreated soil, the types and concentrations of contaminants, and desired treatment objectives, and can be determined through viability and optimization studies in bench, engineering, and/or pilot scale applications of the present invention.

With respect to the adsorbent 4, a preferred form is activated carbon (AC) 4, which may be granular (GAC) or powdered (PAC), or which may contain a broad mixture of particle sizes. When activated carbon is used as the adsorbent, a preferred embodiment of the invention includes the step of saturating the AC with water prior to use in order to fill its micropores to assure maximum treatment efficiency. A tank or other containment unit (not shown) can receive AC 4 from its delivered packaging or a bulk silo brought onsite for large production operations. Water may then be added to AC 4 in the tank. When saturated, the wet AC slurry may be transferred to the mixer 110 using any of a variety of equipment options, such as a slurry, diaphragm, vane, screw pump or the like, or by gravity feed with adequate water content to allow for slurry fluidity. In slurry form, AC water content may allow for a reduction in the amount of water 1 added directly to the soil in the mixer 110. Dry AC may also be augured directly to the mixing chamber 8 of the mixing unit 110; however, the lack of water for mixing and proper adsorbent performance may compromise desired end-product testing criteria and results.

FIG. 2 depicts an in situ approach for delivering water 1 and reagents 2-4 to the soil A to be processed. Equipment such as tillers, disks, plows, or deep mixing devices, such as auger arrays or Kelly-stem cutter heads, can deliver and mix reagents to a variety of depths ranging from near surface soil horizons to over 50 ft below grade within a delineated treatment area 210 to target depths. When mixed with reagent, the treatment end-product C may be excavated and removed from the site or left in-place.

A benefit of the methods depicted in FIGS. 1 and 2 is the ability to adjust and control reagent dosing during processing operations. Water 1, acid 2, oxidizer 3, and adsorbent 4 ratios can be adjusted to accommodate specific characteristics of material to be treated. For example, at remediation sites, soil moisture conditions may change during the course of a project, due to precipitation, soil properties such as well drained sand vs. wet clay, and soil that is within water tables or along water-course shorelines or that is affected by tidal influences. The need for acidity may also change with the soil properties that can change across a site, and similarly for oxidizer need that may be related to natural organic matter content in near surface soils and loams, vs soils from horizons beneath the limits of decaying vegetative plant matter. Another benefit with this approach is the flexibility it provides to allow for the substitution of a particular reagent type without changing the other reagents.

FIGS. 3 and 4 depict additional embodiments of the invention in which contaminated material is treated to lower the leachability of contaminants. A working strength composite reagent (enhanced activated carbon, EAC) is prepared from water 1 and individual reagents 2-4 prior to its addition to and mixing with the contaminated material. A benefit of this approach is that water and reagent ratios, and blended reagent EAC dosing are predetermined and will not need to be changed for a specific soil or solid waste type when that material is fairly uniform in properties and characteristics. For example, an impacted soil on a site may be similar in soil type, contamination levels, and other characteristics. Other examples where the material to be treated has a substantially uniformity based on material source include biosolids from a landfill or sanitary wastewater treatment plant. FIG. 3 illustrates an ex situ application system 300, and FIG. 4 shows an in situ application system 400, but where reagent preparation is made in a plurality of reagent blending component units 405 and mixed with soil in a targeted in situ zone 410.

As in FIG. 1, water 1 and reagents 2-4 are blended with soil in a mixing unit. In FIG. 3, however, water and reagents are initially introduced into a separate blending chamber 30 in predetermined ratios for the specific material being treated. The adsorbent 4 (e.g., activated carbon AC) is also introduced into the blending chamber, and water and the other reagents are mixed using one or more recirculating pumps 5a capable of moving water 1, liquid reagents 2-3, and adsorbent media 4 to prepare a reagent mixture EAC (when activated carbon is used). When AC is pre-blended with the other regents, the mixture is transferred by a slurry or similar pumping/conveyance device 6 to a storage/makeup delivery tank 35 for controlled dosing and delivery to the reagent-soil mixing chamber 8 in the mixing unit 310. Again, reagent delivery beneath screen 7 is a preferred approach, as the screen removes oversize pieces and material from the material to be treated. It also helps avoid using excess reagents, which might otherwise be bound to the large objects.

FIG. 3 also illustrates that additional quantities of water 1 and reagents 2-3 can be added to the mixing chamber 8 after the material to be treated has been screened. Supplemental amounts of adsorbent 4 (not shown) may also be added at this location. As in FIG. 1, the now treated end-product C (an admixture of water, reagents and soil) is transferred by a conveyor 9 to a stockpile staging area 10.

FIG. 4 schematically illustrates another in situ system 400. Water 1 and reagents 2-4 are blended in a plurality of mixing units 40 within a work area 405 to form a single combined reagent EAC. Blending is facilitated by one or more recirculating pumps 5a. The thoroughly mixed reagent EAC is controllably transferred by pump 6 to a soil or waste treatment area 410 at a delivery rate determined by treatment application capacity and demand. Using a plurality of reagent mixing units 40 provides the benefit of having multiple reagent batches in various stages of readiness for processing soil or other material to be treated, making for a more efficient continuous process. Untreated material A in treatment processing zone 410 is blended with the reagent system EAC (delivered by one or more pumps 6) using suitable equipment such as tilling or disking equipment, surface lift roadbed stabilizers, or rotary auger/cutter head drilling units. Transfer of batched reagents from mixing units 40 may also be performed in batch where pump(s) 6 deliver reagent to various storage/delivery methods of the soil/reagent mixing equipment. For example, agricultural tilling and disking applications may require surface application of reagent to surface soil lifts where reagent is pumped across the surface of the material to be processed in set volume quantities. Deep in situ mixing may require steady pumping of material to equipment and mixing tools while they are working vertically to create overlapping secant columns extending from grade to targeted subgrade depths within a set horizontal surface area. Stabilizer processing equipment can receive set tank volumes mounted to their equipment, or be directly supplied by flexible hose or piping to pump 6 as they work soil in the processing area 410. The resulting treated material (end-product C) can be removed from treatment area 410, or left in-place and the treatment processing equipment and zone 410 relocated to another grid node on a site located by surveyed northings and eastings.

Regardless of the type of processing application of soil and reagents shown in the schematic diagrams in FIGS. 1-4, the present invention incorporates water, acid, oxidizer, adsorbent media and mixing to generate an end-product that retains contaminants—including PFAS, mercury, and/or other contaminants—that would otherwise leach from the host material when exposed to fluids such as precipitation and percolation from rain water (acid rain) and snow melt, surface water, groundwater, landfill leachate, and other fluids that enhance contaminant leaching and that also serve as a contaminant carrier.

In the remediation of PFAS-contaminated soil and solid waste, the invention employs an oxidant to mobilize PFAS contamination, an acid for pH control and/or adsorbent activation, and an adsorbent to capture and retain the mobilized contaminants, without elevated temperatures or prolonged processing and reaction time, to achieve desirable treatment results. In embodiments where treated soil is left on site, treated material will not only retain its PFAS, but also remove PFAS from site waters that it may encounter. In addition, the present invention utilizes a reagent set which, when applied to soil or other similar solid forms, generates an end-product of similar consistency, granularity, and permeability, and importantly, does not solidify to a cementitious, low permeable material that has limited if any ability to remove contaminant constituents from fluids that such treated mass may encounter, whether those constituents are PFAS, 1.4-dioxane, dioxins/furans, PNA/PAH' other similar "forever" organic compound and species, or migratory mercury and/or other heavy metals susceptible to the reagents of the present invention.

EXAMPLES

A series of treatment studies applying the technology disclosed herein were applied to a variety of soils. Example 1 presents treatment data for mercury in soil obtained from the remediation site of a former chlor-alkali process that utilized a mercury cell to generate a bleaching product for paper. Example II presents data from the treatment of PFAS-impacted Class A biosolids obtained from a publicly-owned treatment works (POTW) for sanitary sewage. Example III provides data from the treatment of impacted soil sourced from a former large heavy manufacturing facility that contained PFAS as well as low levels of heavy metals and petroleum hydrocarbons. Examples IV-VIII present treatment results of soil obtained from a former manufacturing facility that utilized PFAS as a raw material in its manufactured products. Leachability tests included EPA, SW-846 Test Method 1311 Toxicity Characteristic Leaching Procedure—TCLP—Revision 0, 1992) for landfill leachate exposure, and Method 1312 (Synthetic Precipitation Leaching Procedure—SPLP) for acid rain exposure, using a fluid that replicates acid rain in either the eastern or western United States, dependent on where the soil or waste is to be managed, or sourced if left onsite.

The examples also include data for several soil treatment regimens evaluated for PFAS leachability in various extraction fluids, namely, laboratory grade deionized water; landfill leachate from a RCRA Subtitle D landfill that also contained PFAS; and PFAS-containing groundwater from the site where the soil was sourced. For these alternative extraction fluids, Method 1312 was modified where the alternate fluids were substituted for Method 1312's synthetic acid-rain extraction fluid for the eastern United States with the modification allowed by the method.

Example Treatment and Analytical Methods

Soil aliquots ranging from 300 g to over 2 kg were treated during the studies. All reagents were added on a by weight basis or reagent-to-sample mass basis directly to soil aliquots in glass mixing bowls placed on a top-loading balance, with solid additives added by spatula and liquid reagents added by pipettes and/or volumetric flasks. Soil and reagents were mixed in the mixing bowls using stainless steel spatulas by folding and knifing methods to replicate field mixing to the extent possible. After a period of 2-3 hours from final mixing, a subsample of the treated material was collected for specific analytical testing.

All sample matrices were containerized at the time of grab sample collection in new 5-gallon plastic buckets. Each bucket was returned to the lab during their respective treatment studies and individually mixed to apparent homogeneity. A subsample of each bucket was then obtained and sent to an analytical laboratory for specified analysis before and after treatment. All chain of custody procedures were followed during sample collection and analysis.

To determine the concentration of leachable heavy metals, one measures heavy metal concentration using a leachability test. The EPA publication "Test Methods for Evaluating Solid Waste: Physical Chemical Methods," referred to as "EPA Publication SW-846," the "SW-846 Compendium," or simply "SW-846," describes analytical methods for sampling and analyzing waste and other materials. The 1000 Series is directed to waste characteristics and leaching/extraction methods.

Although most of the methods described in SW-846 are intended as guidance, the method defined parameters (MDPs) are mandated by the RCRA regulations in Title 40 of the CFR. MDPs are physical or chemical properties of materials determined with specific methods used to evaluate whether the materials comply with certain RCRA Subtitle C landfill regulations. MDPs can only be determined by the methods prescribed in RCRA regulations because the methods are set by the federal regulations. The "toxicity characteristic" of solid waste is a mandatory defined parameter. See 40 CFR § 261.24. The TCLP test (Test Method 1311) was devised by the EPA and promulgated to evaluate how waste material and contaminants in that waste would interact with acidic landfill leachate and the physical conditions found in non-hazardous landfills. For example in solid waste, heavy metals that leach in excess of the RCRA toxicity limit will cause the waste to be considered hazardous because the heavy metals could leach into the landfill leachate and, if the landfill is of poor integrity, into groundwater underlying the landfill.

Leachability tests used for the present technology include EPA, SW-846 Test Method 1311 Toxicity Characteristic Leaching Procedure—TCLP—Revision 0, 1992) for landfill leachate exposure, and Method 1312 (Synthetic Precipitation Leaching Procedure—SPLP) for acid rain exposure for using a fluid that replicates acid rain in either the eastern or western United States, dependent on where the soil or waste is to be managed, or sourced if left onsite. Modified versions of Method 1312 are also used where the extract fluid of the method is replaced by fluid from the location or site where processed material is managed, stored or disposed, for example groundwater, acid mine drainage, or another leachate fluid. EPA Method 537M is used to determine total PFAS concentrations in soil or solid matrices and uses methanol to the extract PFAS from the solid sample. ASTM Method D7979-17 is used to evaluate PFAS concentrations in fluids other than drinking water (i.e. site groundwater or landfill leachate) and uses solid phase extraction. The EPA is currently developing test methods for evaluating PFAS in soils, sediments, biosolids, and other solid materials, with draft test methods to be available in the months ahead.

Example I

Example I data from a study using the present invention to reduce the leachability of mercury in soil from a former chlor-alkali plant as determined by analyzing total mercury in extraction fluids of EPA's Method 1311 TCLP. As defined by the RCRA toxicity rule for characteristically hazardous waste, mercury in TCLP extract at a concentration >0.2 mg/L classifies the solid as a hazardous solid waste. Two of the soils ("L" and "M") were sourced from beneath the mercury cell at the site, and the "N" soil was obtained from a tidal sediment/soil location just above the Mean Higher High Water line. L and M soils were separately collected as grab samples from the excavated site areas where elemental mercury droplets were observed and dispersed throughout the exposed soil. The tidal/soil (N) materials were obtained outside of the known limits of the mercury cell, but down-gradient from a former stormwater sewer alignment likely draining the area of the mercury cell building. The samples were obtained over a period of 6 months.

All sample matrices were containerized at the time of grab sample collection in new 5-gallon plastic buckets. Each bucket was returned to the lab during their respective treatment studies and individually mixed to apparent homogeneity in a small plastic-barreled cement mixer. A subsample of each bucket was then obtained and sent to an analytical laboratory for total mercury analysis. L and M soils each contained adequate total mercury for the study, however, the total mercury in the N sediment/soil sample was below levels found in more highly contaminated areas of the site. Because more elevated mercury concentration levels than found in the L and M soil samples were expected for most of the site, and in order to evaluate the present technology's efficacy on highly contaminated material that contained elemental mercury, the N soil sample was spiked intermittently throughout its matrix with elemental mercury droplets from a lab pipette as the contents of the sample bucket were re-blended within the mixer. The N-series treatments were performed on both unspiked and spiked samples, with the unspiked sample matrix treated with various versions of known technologies to reduce the leachability of mercury despite the low total mercury concentration. All mixed soils for the study were returned to their respective buckets for use in the treatability studies.

The L and M soils were treated in a series of samples using the reagents of the present invention, and the M soil was also treated using a sulfide-based technology known for its ability to form highly insoluble mercury sulfide precipitates within the soil matrix. The spiked N soil was also treated using the reagents of the present invention.

Soil aliquots ranging from 300 g to over 2 kg were treated during the studies. All reagents were added on a gravimetric basis directly to soil aliquots in glass mixing bowls placed on a top-loading balance with solid additives added by spatula, and liquid reagents added by pipettes and/or volumetric flasks. Soil and reagents were mixed in the mixing bowls using stainless steel spatulas by folding and knifing methods to replicate field mixing to the extent possible. After a period of 2-3 hours from final mixing, a subsample of the treated material was collected for analytical testing. Results of the studies are presented in Table 2.

TABLE 2

Former Chlor-Alkalai Mercury Cell Facility Site Soil
Mercury Leachability: Method 1311 (TCLP)

| Sample ID | Total Hg (mg/Kg) | TCLP Hg (mg/L) | 20% Nitric Acid (%) | Phosphoric Acid (%) | 50% Hydrogen Peroxide (%) | Granular Activated Carbon (%) | R-Sulfide (%) | Water (%) | Total Dose (excluding water) (%) | RCRA Limit (<0.2 mg/L) |
|---|---|---|---|---|---|---|---|---|---|---|
| Untreated L-Series | 6000 | 1.69 | — | — | — | — | — | — | — | fail |
| L-1 | | 0.115 | — | 3.1 | 0.5 | 1 | — | 7.5 | 4.6 | pass |
| L-2 | | 1.32 | 9.1 | — | — | 1 | — | 7.5 | 10.1 | fail |
| L-3 | | 0.0108 | 3.0 | — | 0.25 | 1 | — | 9.0 | 4.25 | pass |
| Untreated M-Series | 13,566 | 2.06 | — | — | — | — | — | — | — | fail |
| M-1 | | 2.00 | — | — | — | — | 2 | 8 | 2 | fail |
| M-2 | | 1.74 | — | 1.3 | — | — | 3.3 | 8 | 4.6 | fail |
| M-3 | | 0.088 | — | 1.3 | 0.25 | 3.3 | — | 8 | 4.85 | pass |
| Upland N-series Untreated | 1455 | N/R | — | — | — | — | — | — | — | N/R |
| N1-1 | | 0.427 | — | — | 3 | 0.9 | 3 | 7 | 6.9 | fail |
| N1-2 | | 1.78 | — | 0.34* | — | — | 10.2 | 7 | 10.2 | fail |
| N1-4 | | 0.92 | — | — | — | 3 | — | 7 | 3 | fail |
| Untreated - Spiked | 75,625 | 23.3 | — | — | — | — | — | — | — | fail |
| N2-1 | | 0.52 | — | — | — | — | 2 | 7 | 2 | fail |
| N2-2 | | 0.061 | 0.5 | — | 1 | 2 | — | 7 | 3.5 | pass |
| N2-3 | | 0.087 | — | 1 | 1.25 | 2 | — | 7 | 4.25 | pass |

*NOTE:
Phosphate provided as sodium phosphate (vs. 54% phosphoric acid)

In the L-series, L-1 was dosed with 3.1% by weight of 54% technical merchant grade phosphoric acid, 0.5% of 50% hydrogen peroxide, and 1 GAC, L-2 was dosed with 9.1% of 20% concentrated industrial grade nitric acid, and 1% GAC; and L-3 was dosed with 3.0% of 20% nitric acid, 0.25% hydrogen peroxide, and 1% GAC. All GAC was prepared for the study by placing dry granular activated carbon in a container and filling it with distilled water so that all GAC was submerged and fully wetted. This mixture was allowed to completely saturate for a period of 24 hours to remove air from the GAC. After saturation and prior to GAC use as a reagent, free-board water from above the carbon line was poured from the container prior to removal of the carbon and its addition to soil by lab spatula as a wet slurry.

The data present in Table 2 show that TCLP mercury in the L soil was reduced to below the 0.2 mg/L RCRA limit for hazardous waste for leachable mercury in samples L-1 and L-3 using reagents of the present invention. However, L-2, using the high level nitric acid dose, did not significantly lower TCLP mercury from the untreated level. Both L-1 and L-3 included hydrogen peroxide in the reagent set along with an acid and GAC, while L-2 was not dosed with hydrogen peroxide. Rather, L-2 did receive an elevated dose 9.1% of nitric acid which is also an oxidizer. L-2 did not achieve desired treatment objectives, suggesting that either the acidity provided was excessive, and/or the oxidizing potential of nitric acid was not sufficient. It is likely that the excessive amount of nitric acid prevented adequate adsorption of mercury to the active surfaces of the GAC. However, L-3 (which had a nitric acid dose roughly three (3) times less than L-2, as well as the presence of hydrogen peroxide) not only met the RCRA criteria for mercury as a hazardous waste of <0.2 mg/L, but also the EPA's LDR limit of <0.025 mg/L. Treatment results of the present technology for both L-1 and L-3 reduced the leachable level of mercury to below the hazardous waste toxicity criteria of <0.2 mg/L as defined by RCRA. Further, L-3 reduced the leachable level of mercury to below the EPA's LDR limit of <0.025 mg/L, allowing it to be disposed in a licensed landfill.

M-series soil samples were also treated for leachable mercury. Sample M-1 was treated only with a reactive sulfide and sample M-2 was treated with phosphoric acid and reactive sulfide. Neither sample M-1 nor M-2 adequately treated TCLP mercury to below the RCRA toxicity limit. Sample M-3 was treated with the reagents of the present technology, including phosphoric acid, hydrogen peroxide, and granular activated carbon, and passed the RCRA limit (<0.2 mg/L). This treatment series illustrates one advantage of using the disclosed reagent system of the present invention to treat soil that contains elevated levels of total mercury, and mercury in elemental droplets.

With respect to the N soil samples that contained a lower total mercury concentration than L and M soils, soil as sampled and mixed, and mixed soil as sampled and spiked, were subjected to a series of treatments to reduce leachable mercury. The N1-series of samples was not spiked, and N2-series samples were spiked. The treatments applied to the N1 sample series included: N1-1 with 3% by weight of 50% hydrogen peroxide, 0.9% of GAC, and 3% of a reactive sulfide; N1-2 with 0.34% sodium phosphate (instead of phosphoric acid), and 10.2% reactive sulfide; N1-3 was treated with only GAC using a 3% dose. No treatments of this regime adequately reduce leachable TCLP mercury to below the RCRA limit of <0.2 mg/L, despite the low total mercury concentration relative to the L and M soils.

For the spiked N soils, the samples N2-1 through N2-3 present data from the following treatment regimens: N2-1 was treated with only 2% by weight of a reactive sulfide; N2-2 using 0.5% by weight of a 20% nitric acid solution, 1% of 50% hydrogen peroxide, and 2% GAC; and N2-3 with 1% phosphoric acid, 1.25% of 50% hydrogen peroxide, and 2% GAC. Sample N2-1 as treated with only a reactive sulfide failed to meet the RCRA toxicity limit. In contrast, samples N2-2 and N2-3 each met the RCRA toxicity limit of <0.2 mg/L. The results are particularly notable given the extremely elevated concentrations of total mercury (including elemental droplets) and TCLP mercury in the spiked material.

PFAS Examples

Examples II through VIII reflect data for the treatment of a variety of PFAS compounds or "telomeres." Table 3 presents the chemical name of each telomere, the number of carbon atoms in the telomere, and its acronym. All PFAS data tables subsequent to Table 3 list telomeres by acronym only.

TABLE 3

PFAS Telomer3 Chemical Names and Carbon Atoms

| Telomere | Chemical Name | C Atoms |
|---|---|---|
| PFBA | Perfluorobutanoic Acid | C4 |
| PFPeA | Perfluoropentanoic Acid | C5 |
| PFHxA | Perfluorohexanoic Acid | C6 |
| PFHpA | Perfluoroheptanoic Acid | C7 |
| PFOA | Perfluorooctanoic Acid | C8 |
| PFNA | Perfluorononanoic Acid | C9 |
| PFDA | Perfluorodecanoic Acid | C10 |
| PFUnA | Perfluoroundecanoic Acid | C11 |
| PFDoA | Perfluorododenoic Acid | C12 |
| PFTriA | Perfluorortridecanoic Acid | C13 |
| PFTeA | Perfluortetradecanoic Acid | C14 |
| PFBS | Perfluorobutanesulfonic Acid | C4 |
| PFPeS | Perfluoropentanesulfonic Acid | C5 |
| PFHxS | Perfluorohexanesulfonic Acid | C6 |
| PFHpS | Perfluoroheptanesulfonic Acid | C7 |
| PFOS | Perfluorooctanesulfonic Acid | C8 |
| PFNS | Perfluorononanesulfonic Acid | C9 |
| PFDS | Perfluorodecanesulfonic Acid | C10 |
| FtSA 4:2 | Fluorotelomer Sulfonic Acid 4:2 | C6 |
| FtSA 6:2 | Fluorotelomer Sulfonic Acid 6:2 | C8 |
| FtSA 8:2 | Fluorotelomer Sulfonic Acid 8:2 | C10 |
| PFOSA | Perfluorooctanesulfonaminde | C8 |
| EtFOSSA | N-Ethylperfluorooctrane sulfonicamidoacetic Acid | C12 |
| MeFOSAA | N-Methylperfluorooctrane sulfoniceamidoacetic Acid | C11 |
| ADONA* | 11Cl-Pf3OUdS | C10 |
| DONA* | 4,8-dioxa-3H-perfluorononanoic acid | C7 |
| HFPO-DA, GenX* | Hexafluoropropylene oxide dimer acid | C6 |

Example II presents PFAS data for the treatment of biosolids from a publicly-owned treatment works (POTW) for sanitary sewage. The sampled biosolids were treated by the POTW for EPA permitted Class A designated agricultural use as a fertilizer or compost, however, they both contained total and leachable PFHxS and PFOS telomeres of the PFAS family of chemicals. Table 4 presents that data along with the results of samples (B-1, B-2, and B-3) treated by the present technology.

Reagents were added on a by weight or reagent-to-sample mass basis as previously described. Sample B-1 was processed with 10% GAC and 10% of a 20% solution of concentrated nitric acid; sample B-2 was treated with 15% GAC and 4% of a 20% nitric acid; and B-3 was treated with 2% GAC and 4% of a the 20% nitric acid solution. The resultant pH of the three (3) samples was 1.51, 3.03, and 4.33 S.U., respectively. Because nitric acid functions as both an acid and an oxidizer, and given the visible reaction of the acid with the organic matter of each sample, no separate oxidizer such as hydrogen peroxide was added. There was one variation with respect to the GAC that was added from previously described preparation. The GAC was saturated in water that was adjusted to a pH of 5.5 S.U. with nitric acid for a period of 24 hours prior to its addition to the sample (referred to as GAC-N).

TABLE 4

POTW Raw Biosolids
PFAS Leachability: Method 1311 (TCLP)

| | UNTREATED | TREATED Biosolids | | |
|---|---|---|---|---|
| Telomere | Biosolids Totals in Biosolids (ug/Kg) | B-1 Biosolids Extract (ug/L) | B-2 Biosolids Extract (ug/L) | B-3 Biosolids Extract (ug/L) |
| PFHpA | <13 | <2 | <2 | <2 |
| PFOA | <13 | <8 | <8 | <8 |
| PFNA | <13 | <4 | <4 | <4 |
| PFBS | <13 | <18 | <18 | <18 |
| PFHxS | 71 | <6 | <6 | <6 |
| PFOS | 29 | <8 | <8 | <8 |

The results of the study presented in Table 4 show that the leachable PFAS telomeres (PFOS and PFHxS) in untreated material were reduced in leachability to below the analytical method detection limit as measured in Method 1311 (TCLP) extract of each sample as a result of treatment. While further testing is needed using analytical methods with lower detection limits, the data clearly identify significant reduction of the two PFAS telomeres when the present invention is used. With more definitive testing using low detection limit analytical and sample clean-up procedures to remove interferences, such results will likely indicate that one of more of the invention-treated samples meets the EPA advisory PFAS level of PFAS in drinking water of 70 ppt (ng/L), even without optimization or the use of supplemental oxidizer reagent to further destroy interfering organic matter constituents.

Even though the TCLP extraction test procedure does not apply or directly relate to drinking water test methods, the TCLP procedure does provide an indicator as to the leachability of PFAS from a solid in laboratory-grade synthetic landfill leachate. The application of the present invention to biosolids provides an option for possible management of biosolids within a licensed landfill. Should exceptionally low leachable TCLP PFAS data be generated, coupled with low levels in more expansive testing such as with acid-rain leaching (Method 1312) on the treated materials, use of the material for agricultural purposes may be possible.

Example III

Example III presents data for untreated and treated soil from a former large manufacturing heavy industry site undergoing site remediation. The soil was obtained from an area known to contain heavy metals, petroleum hydrocarbons, and PFAS. While metals and hydrocarbons concentrations were low enough to allow for onsite management or offsite disposal as a non-hazardous waste, the level of PFAS caused environmental managers to consider site control options. A treatability study using the present invention was conducted to evaluate process efficacy, both in terms of total PFAS in soil (treated and untreated) and TCLP leachability (with treatment and without treatment).

Composite soil from the site was blended and then subsampled in 500 g aliquots for each treatment run (F-1 through F-4). Untreated and treated samples were analyzed using EPA Method 537M for total PFAS in soil and ASTM Method 5959-17 for the TCLP extract. Sample F-1 was treated with a 3.4% by weight dose (dry weight basis) of a slurry of GAC (the GAC was previously immersed in water for 24 hours) with its pH adjusted to 5.5 S.U. with nitric acid, and 2% by weight of a 20% nitric acid solution. Total water added to the sample was 16.9% due to its excessive dryness, with approximately half (8%) of the total water added prior to the other reagents. The initial 8% addition rate of water was also added to samples F-2 through F-4 for consistency between treatments. Additional water was added to each sample after the other reagents to achieve similar end-product consistencies, with total water amounts reported for the entire amount added. Sample F-2 was treated with 3.6% of the same GAC-N as F-1, 0.44% of 50% hydrogen peroxide, and 3.6% of the 20% nitric acid solution. Total water was added at 13.2%. Sample F-3 was treated with 6.3% of the nitric acid-treated GAC, and 6% of 54% merchant grade phosphoric acid. Water was added at 17.1%. Sample F-4 received 7% of GAC-N, 6% nitric acid, and 16.3% water. Analytical results from the study are presented in Table 5a for PFAS in TCLP extract, and Table 5b for PFAS as totals in soil.

TABLE 5a

Industrial Site—Soil A
PFAS Leachability: Method 1311 (TCLP)

| Telomere | UNTREATED Soil Totals in Soil Extract (ng/L) | TREATED Soil | | | |
|---|---|---|---|---|---|
| | | F-1 Soil Extract (ng/L) | F-2 Soil Extract (ng/L) | F-3 Soil Extract (ng/L) | F-4 Soil Extract (ng/L) |
| PFHxA | 4.15J | <4.0 | <4.0 | <4.0 | <4.0 |
| PFHpA | <4.0 | <4.0 | <4.0 | <4.0 | <4.0 |
| PFOA | <4.0 | <4.0 | <4.0 | <4.0 | <4.0 |
| PFNA | <4.0 | <4.0 | <4.0 | <4.0 | <4.0 |
| PFDA | <4.0 | <4.0 | <4.0 | <4.0 | <4.0 |
| PFUnA | <4.0 | <4.0 | <4.0 | <4.0 | <4.0 |
| PFDoA | <4.0 | <4.0 | <4.0 | <4.0 | <4.0 |
| PFTriA | <4.0 | <4.0 | <4.0 | <4.0 | <4.0 |
| PFTeA | <4.0 | <4.0 | <4.0 | <4.0 | <4.0 |
| PFBS | <4.0 | <4.0 | <4.0 | <4.0 | <4.0 |
| PFHxS | 14.3 | <4.0 | <4.0 | <4.0 | <4.0 |
| PFOS | 105 | <4.0 | 16.7 | <4.0 | <4.0 |

Note:
Janalyte was positively identified, but numeric value reported was approximated.

As shown in Table 5a, samples F-1, F-3, and F-4 all retained TCLP leachable PFHxS and PFOS to below the analytical method detection limit of 4 ppt (ng/L). Notably however, the treatments applied respectively to the four (4) samples all reduced leachable PFAS in TCLP to below EPA's 70 ng/L PFAS advisory limit for drinking water.

Table 5b presents the data for total PFAS telomeres in untreated and treated samples.

TABLE 5b

Industrial Site—Soil A
PFAS Totals: EPA 537M

| Telomere | UNTREATED Soil Totals in Soil (ug/Kg) | TREATED Soil | | | |
|---|---|---|---|---|---|
| | | F-1 Soil (ug/Kg) | F-2 Soil (ug/Kg) | F-3 Soil (ug/Kg) | F-4 Soil (ug/Kg) |
| PFHxA | <.21 | <.23 | <.22 | <.24 | <.23 |
| PFHpA | <.26 | <.29 | <.28 | <.30 | <.29 |
| PFOA | <.26 | <.29 | <.28 | <.30 | <.29 |
| PFNA | <.26 | <.29 | <.28 | <.30 | <.29 |
| PFDA | <.26 | <.29 | <.28 | <.30 | <.29 |
| PFUnA | <.26 | <.29 | <.28 | <.30 | <.29 |
| PFDoA | <.26 | <.29 | <.28 | <.30 | <.29 |
| PFTriA | <.26 | <.29 | <.28 | <.30 | <.29 |
| PFTeA | <.26 | <.29 | <.28 | <.30 | <.29 |
| PFBS | <.26 | <.29 | <.28 | <.30 | <.29 |
| PFHxS | 0.837J | 0.307J | 0.543J | <.30 | <.29 |
| PFOS | 13.90 | 3.93 | 7.21 | 2.77 | 2.76 |
| EtFOSSA | <.52 | <.58 | <.56 | <.60 | <.59 |
| MeFOSAA | <.52 | <.58 | <.56 | <.60 | <.59 |

Note:
Janalyte was positively identified, but numeric value reported was approximated.

When TCLP leachable PFAS data in Table 5a is compared to total PFAS data in Table 5b in each of the treated samples reported in Table 4b, remarkably, treatments for F-1, F-3, and F-4 all reduced the total amount of PFAS quantified. While some dilution between the untreated and treated samples was caused by the mass of reagents added, the magnitude of total PFAS differences cannot be attributable solely to this, particularly when total PFAS analyses were performed and data was reported on a dry sample weight basis. It is also plausible that PFAS heterogeneous disbursement throughout the sample mass also contributed to the apparent differences in total PFAS, from untreated to treated samples.

However, in consideration of F-2 total and TCLP data when compared to data sets for F-1, F-3, and F-4, and in view of the amount of GAC added to these, a very likely cause for the reduction is the effects of the additional GAC as enhanced with acid, and the addition of the oxidizer likely resulted in the adsorption of PFAS to GAC surfaces with attractive forces such that the solvent (methanol) used to extract PFAS from the solid mass in the analytical method could not elute all of the PFAS mass retained in the treated mass. Specifically, F-2 contained hydrogen peroxide, but it received the same amount of GAC as F-1; and F-3 and F-4 contained ~1.8-2 times the GAC as F-1, but no hydrogen peroxide. It is also noted that F-3 and F-4 received different acid types, with F3 having nitric (in the GAC-N) and phosphoric acid, whereas F-4 received only nitric acid and GAC-N, suggesting that acidity type (despite proticity, disassociation, and anionic differences) also played an important role with the GAC and oxidizer. Regardless of the mechanism, the data suggests that the present invention not only causes PFAS to be retained within the treated solid mass when evaluated using conventional leaching methods (Method 1311—TCLP), but also has the ability to further enhance PFAS retention within the host matrix when evaluated with the harsh eluant for the total PFAS Method (EPA 537M).

Examples IV-VIII

A treatability study was performed on a soil obtained from a PFAS remediation site (Industrial Site Soil B). The intent of the study was to evaluate the present invention when treated samples were subjected to a variety of extraction methods and fluids. Specifically, the same treated samples were split into duplicates, and each duplicate of each treatment regimen was separately analyzed. Extraction methods applied to both untreated and the treated samples included:

Method 1311—TCLP; Method 1312—SPLP; (modified) Method 1312—deionized laboratory water extraction fluid modified Method 1312—Subtitle D landfill leachate extraction fluid; and modified Method 1312—contaminated groundwater extraction fluid. The data for the respective lab results are included in the tables presented in Examples IV-VIII.

The following reagent systems were employed, with reagents add on a % weight-basis to untreated soil mass:

Sample T-1 was treated using 10% GAC-N and 0.71% nitric acid and no hydrogen peroxide. Initial water was added at 6%. GAC-N consisted of GAC that was allowed to saturate in water adjusted to a pH of 5.5 S.U. with nitric acid for a period of 24 hours.

Sample T-2 was treated using 5% GAC-N and 1.3% nitric acid and no hydrogen peroxide. Initial water was added at 7.5%.

Sample T-3 was treated using 0.48% hydrogen peroxide (50%), 8.7% GAC-N and 0.64% nitric acid. Initial water was added at 7.5%.

Sample T-4 was treated using 0.48% hydrogen peroxide (50%), 0.75% nitric acid, 9% GAC-P and 1.45% phosphoric acid, where GAC-P consisted of GAC that was allowed to saturate in water adjusted to a pH of 5.5 S.U. with phosphoric acid for a period of 24 hours. Initial water was added at 7.7%

Because of the extremely dry and friable nature of the untreated soil, and a fairly high, apparent crumbly clay particle content, additional water was added to each of the treated soils that received initial water and reagents to achieve a material more readily mixed by folding and blending procedures. Total water added to the samples T-1 through T-4 were 16.9%, 13.2%, 16.3%, and 17.1%, respectively.

Example IV

The untreated and treated samples T-1 and T-2 were subjected to the (modified) Method 1312 where laboratory grade deionized water was used as the substitute extraction fluid in Example IV. Table 6 presents the data for both total and leachable PFAS in untreated samples, and leachable PFAS in the two treated samples. A replicate sample of the untreated soil was submitted for total PFAS analysis. Presented data includes total PFAS telomeres for each replicate, and the average total PFAS by telomere. Note that in all subsequent examples and data tables, the average total PFAS data by telomere is presented.

TABLE 6

Industrial Site-Soil B
PFAS Leachability: (MODIFIED) Method 1312
(Deionized Water Extraction Fluid)

| Telomere | UNTREATED Soil | | | | | TREATED Soil | |
|---|---|---|---|---|---|---|---|
| | Totals in Soil (ng/Kg) | Totals in Soil (Replicate) (ng/Kg) | Totals in Soil (avg.) (ng/Kg) | Totals in DI Water (ng/L) | Totals in Soil Extract (ng/L) | T-1 Soil Extract (ng/L) | T-2 Soil Extract (ng/L) |
| PFBA | <0.27 | 264 | 264 | ND | <49 | <50 | <50 |
| PFPeA | <0.22 | <0.20 | <0.21 | ND | <49 | <50 | <50 |
| PFHxA | <0.22 | <0.20 | <0.21 | ND | <49 | <50 | <50 |
| PFHpA | <0.27 | <0.25 | <0.26 | ND | <49 | <50 | <50 |
| PFOA | 618 | 453 | 536 | ND | 13 | <10 | <10 |
| PFNA | <0.27 | <0.25 | <0.26 | ND | <9.7 | <10 | <10 |

TABLE 6-continued

Industrial Site-Soil B
PFAS Leachability: (MODIFIED) Method 1312
(Deionized Water Extraction Fluid)

| Telomere | UNTREATED Soil | | | | | TREATED Soil | |
|---|---|---|---|---|---|---|---|
| | Totals in Soil (ng/Kg) | Totals in Soil (Replicate) (ng/Kg) | Totals in Soil (avg.) (ng/Kg) | Totals in DI Water (ng/L) | Totals in Soil Extract (ng/L) | T-1 Soil Extract (ng/L) | T-2 Soil Extract (ng/L) |
| PFDA | 1,300 | 1,050 | 1,175 | ND | <49 | <50 | <50 |
| PFUnA | <0.27 | <0.25 | <0.26 | ND | <49 | <50 | <50 |
| PFDoA | 474 | 313 | 394 | ND | <49 | <50 | <50 |
| PFTriA | <0.27 | <0.25 | <0.26 | ND | <49 | <50 | <50 |
| PFTeA | 1270 | <0.25 | 1,270 | ND | <49 | <50 | <50 |
| PFBS | <0.27 | <0.25 | <0.26 | ND | <9.7 | <10 | <10 |
| PFPeS | <0.27 | <0.25 | <0.26 | ND | <9.7 | <10 | <10 |
| PFHxS | <0.27 | <0.25 | <0.26 | ND | <49 | <50 | <50 |
| PFHpS | <0.27 | <0.25 | <0.26 | ND | <49 | <50 | <50 |
| PFOS | 34,400 | 24,800 | 29,600 | ND | 660 | <10 | <10 |
| PFNS | 438 | 254 | 346 | ND | <49 | <50 | <50 |
| PFDS | 864 | 665 | 765 | ND | <9.7 | <10 | <10 |
| FtSA 4:2 | <0.27 | <0.25 | <0.26 | ND | <49 | <50 | <50 |
| FtSA 6:2 | <0.27 | <0.25 | <0.26 | ND | <49 | <50 | <50 |
| FtSA 8:2 | <0.27 | <0.25 | <0.26 | ND | <49 | <50 | <50 |
| PFOSA | 7,240 | 5,290 | 6,265 | ND | 110 | <10 | <10 |
| EtFOSSA | 5,100 | 3,010 | 4,055 | ND | 69 | <50 | <50 |
| MeFOSAA | <0.55 | <0.49 | <0.52 | ND | <49 | <50 | <50 |

NOTE:
DI water was not analyzed as a distinct sample of extract fluid. Lab ran DI water blank samples as part of the analytical QA/QC Samples T-1 and T-2, treated using the reagents of the present invention and as previously discussed, did not leach PFAS above the analytical method detection limit, whereas untreated sample material was characterized as leaching 13 and 660 ng/L of PFOA and PFOS, respectively, into the lab grade DI water used as the extraction fluid for this Example IV. Data for total and leachable PFOA and PFOS are highlighted in bold for both untreated and treated samples. While this method does not necessarily allow for determining management options for the site soil, the data and method do indicate that leachable PFAS does not migrate into a high purity water from material treated by the present invention—with nitric acid providing both acidity and some oxidation. PFAS did leach from the untreated material at levels that exceed EPA's 70 ppt level for drinking water.

Example V

Example V presents the data for untreated material and treated samples T-1 and T-2 when subjected to Method 1312 (SPLP) for the synthetic acid-rain stipulated in the Method for the eastern United States as shown in Table 7.

TABLE 7

Industrial Site—Soil B
PFAS Leachability: Method 1312 (SPLP: acid rain-Eastern U.S.)

| Telomere | UNTREATED Soil | | TREATED Soil | |
|---|---|---|---|---|
| | Totals in Soil (avg.) (ng/Kg) | Totals in SPLP Extract (ng/L) | T-1 Soil SPLP Extract (ng/L) | T-2 Soil SPLP Extract (ng/L) |
| PFBA | 264 | <4.0 | <50 | <50 |
| PFPeA | <0.21 | <4.0 | <50 | <50 |
| PFHxA | <0.21 | <4.0 | <50 | <50 |
| PFHpA | <0.26 | <4.0 | <50 | <50 |

TABLE 7-continued

Industrial Site—Soil B
PFAS Leachability: Method 1312 (SPLP: acid rain-Eastern U.S.)

| | UNTREATED Soil | | TREATED Soil | |
| --- | --- | --- | --- | --- |
| Telomere | Totals in Soil (avg.) (ng/Kg) | Totals in SPLP Extract (ng/L) | T-1 Soil SPLP Extract (ng/L) | T-2 Soil SPLP Extract (ng/L) |
| PFOA | 536 | 16.9 | <10 | <10 |
| PFNA | <0.26 | <4.0 | <10 | <10 |
| PFDA | 1,175 | 23.2 | <50 | <50 |
| PFUnA | <0.26 | <4.0 | <50 | <50 |
| PFDoA | 394 | <4.0 | <50 | <50 |
| PFTriA | <0.26 | <4.0 | <50 | <50 |
| PFTeA | 1270 | <4.0 | <50 | <50 |
| PFBS | <0.26 | <4.0 | <10 | <10 |
| PFPeS | <0.26 | <4.0 | <10 | <10 |
| PFHxS | <0.26 | <4.0 | <50 | <50 |
| PFHpS | <0.26 | <4.0 | <50 | <50 |
| PFOS | 29,600 | 742 | <10 | <10 |
| PFNS | 346 | 5.95 | <50 | <50 |
| PFDS | 765 | 5.09 | <10 | <10 |
| FtSA 4:2 | <0.26 | <4.0 | <50 | <50 |
| FtSA 6:2 | <0.26 | <4.0 | <50 | <50 |
| FtSA 8:2 | <0.26 | <4.0 | <50 | <50 |
| PFOSA | 6,265 | 172 | <10 | <10 |
| EtFOSSA | 4,055 | 87.7 | <50 | <50 |
| MeFOSAA | <0.52 | ND | ND | ND |

As in Example IV, Example V showed that no leachable PFAS telomeres were found in resultant extract fluids for either of the treated samples above the analytical method's detection limit while untreated soil did leach PFAS telomeres into the SPLP acid rain fluid. In particular, PFOA and PFOS leached at 16.9 and 742 ng/L, respectively, but other leachable telomeres including PFDA, PFNS, PFDS, PFOSA, and EtFOSSA were also elevated. With the leachable PFAS telomeres all being below the EPA advisory level of 70 ppt (ng/L) for drinking water when exposed to acid rain, the data supports management of treated material onsite as an options for this material, whereas untreated material far exceeds EPA's advisory limit and is unsuitable for management onsite. Further, the untreated material with its level of leachable PFAS telomeres is also not acceptable for disposal in many RCRA subtitle D non-hazardous waste landfills due to PFAS leachability into interned landfill waste cells and leachate derived from acid rain. However, treated material would not leach PFAS in a landfill when subjected to acid-rain precipitation and percolation that contacts soil and waste in near surface lifts of landfill cells. Also as in Example IV, the use of nitric acid to provide oxidative potential to the treatment regimens was adequate to accommodate the fairly mild characteristics of the SPLP extraction fluid.

Example VI

The lab results of Example VI, presented in Table 8, also support the unlikelihood of a RCRA Subtitle D Landfill to accept untreated site soil for disposal, due to PFAS telomere leachability. In this example, untreated material and treated samples T-1 through T-4 were subjected to ASTM 5959-17 analysis of Method 1311 (TCLP) extract. As noted earlier for this series of treatment samples, the GAC in Example VI was pretreated by water that was pH adjusted to 5.5 S.U. In samples T-1, T-2 and T-3, the GAC was saturated in water with nitric acid pH adjustment (GAC-N), and sample T-4 was saturated in water with phosphoric acid pH adjustment.

Unlike T-1 and T-2 where nitric acid was the sole oxidant, T-3 and T-4 treatment reagents included 50% hydrogen peroxide at equivalent doses of 0.48%.

TABLE 8

Industrial Site - Soil B
PFAS Leachability: Method 1311 (TCLP)

| | UNTREATED Soil | | TREATED Soil | | | |
| --- | --- | --- | --- | --- | --- | --- |
| Telomere | Totals in Soil (avg.) (ng/Kg) | Totals in TCLP Extract (ng/L) | T-1 Soil Extract (ng/L) | T-2 Soil Extract (ng/L) | T-3 Soil Extract (ng/L) | T-4 Soil Extract (nd/L) |
| PFBA | 264 | 50,000 | 49,000 | 50,000 | <50 | <50 |
| PFPeA | <0.21 | 7,600 | 6,700 | 6,900 | <50 | <50 |
| PFHxA | <0.21 | 6,600 | 6,100 | 5,900 | <50 | <50 |
| PFHpA | <0.26 | 1,200 | 910 | 760 | <50 | <50 |
| PFOA | 536 | 4,400 | 1,800 | 1,000 | <10 | <10 |
| PFNA | <0.26 | 62 | 50 | 36 | <10 | <10 |
| PFDA | 1,175 | <50 | <50 | <50 | <50 | <50 |
| PFUnA | <0.26 | <50 | <50 | <50 | <50 | <50 |
| PFDoA | 394 | <50 | <50 | <50 | <50 | <50 |
| PFTriA | <0.26 | <50 | <50 | <50 | <50 | <50 |
| PFTeA | 1.27 | <50 | <50 | <50 | <50 | <50 |
| PFBS | <0.26 | 12,000 | 11,000 | 11,000 | <10 | <10 |
| PFPeS | <0.26 | 480 | 390 | 360 | <10 | <10 |
| PFHxS | <0.26 | 1,900 | 1,000 | 690 | <50 | <50 |
| PFHpS | <0.26 | 84 | <50 | <50 | <50 | <50 |
| PFOS | 29,600 | 1,700 | 1,500 | 630 | <10 | <10 |
| PFNS | 346 | <50 | <50 | <50 | <50 | <50 |
| PFDS | 765 | <50 | <50 | <50 | <10 | <10 |
| FtSA 4:2 | <0.26 | 76 | 79 | 79 | <50 | <50 |
| FtSA 6:2 | <0.26 | 3,500 | 1,300 | 1,200 | <50 | <50 |
| FtSA 8:2 | <0.26 | <50 | <50 | <50 | <50 | <50 |
| PFOSA | 6265 | <50 | 20 | <50 | <50 | <50 |
| EtFOSSA | 4,055 | 62 | <50 | <50 | <50 | <50 |
| MeFOSAA | <0.52 | <50 | <50 | <50 | <10 | <10 |
| ADONA* | NA | NA | NA | NA | <10 | <10 |
| DONA* | NA | NA | NA | NA | <10 | <10 |
| HFPO-DA, GenX | NA | NA | NA | NA | <50 | <50 |

NOTE:
*ADONA, DONA, HFPOA-DA/GenX were added to the state's analytical list in March 2020 after treatment study commenced.

Table 8 presents the leachable PFAS telomere data in TCLP extracts analyzed by ASTM D5959-17 for both untreated and treated soil. With respect to the leachable PFAS in Sample T-1 and T-2, the combination of nitric acid and GAC-N alone did not perform well. However, treated samples T-3 and T-4, both of which received the additional hydrogen peroxide oxidant, had leachable PFAS telomeres in TCLP extract below the analytical method detection limits. The data clearly demonstrates the importance of including sufficient oxidant to reduce PFAS leachability, particularly in a more severe extraction fluid as that of Method 1311 TCLP fluid. The preferred treatment reagent set embodiment by the present technology substantially lowered leachable PFAS from the soil, rendering the material suitable for RCRA subtitle D landfill disposal. This data, coupled with that of the SPLP extraction data, provide further support for the ability of material treated by the technology to be managed onsite, but also for its disposal in a licensed landfill.

Example VII

PFAS leachability as shown in Example V—SPLP acid rain, and in Example VI—TCLP synthetic landfill leachate extraction fluid testing, both show the ability of the present technology to reduce the leachability of PFAS telomeres. However, both of these test fluids were comprised of high purity laboratory-grade reagents that do not adequately reflect the severity of actual RCRA Subtitle D landfill leachate characteristics. Further and importantly, most if not all of the non-hazardous waste landfills generate leachate that contains PFAS as described elsewhere in this specification. Actual landfill leachate (vs. TCLP fluid) contains many chemicals and characteristics that can severely enhance the leachability of PFAS from interned waste material. Therefore, Example VII was devised to evaluate the performance of untreated and treated material when subjected to actual leachate from a RCRA Subtitle D landfill, but also to observe the concentration of PFAS in leachate relative to the PFAS in leachate from soil after it was used as the extraction fluid for the subject Industrial Soil B. Both the soil and the leachate used in the evaluation testing contained migratory PFAS.

Table 9 presents the total PFAS in untreated soil, total PFAS in the landfill leachate used for the extraction fluid, PFAS in the extract of untreated sample, and the PFAS in the landfill leachate extracts of treated soil samples. Untreated Industrial Soil B, and treated sample T-2, T-3, and T-4 were subjected to (modified) Method 1312 using landfill leachate as the extraction fluid where the treated samples were processed as previously described herein. It should be noted that the treated samples were not optimized specifically to the extraction fluid, but the results in Table 9 suggest that results can be further improved with some adjustment to the treatment.

however PFBS and PFHpA at 7,400 and 4,400 ng/L were very elevated relative to the same telomeres in untreated soil. With regard to PFAS in the extract of untreated soil, it appears that PFOA and PFOS were both absorbed minimally by the untreated soil during the extraction process as was PFHpA. Other telomeres were also absorbed to a lesser degree, while others were released from the soil during extraction.

With respect to treated samples, the combined total of leachable PFOA and PFOS was reduced from ~500 ng/L in untreated sample extract to 252, 208, and 143 ng/L, respectively in samples T-2, T-3, and T-4. Significantly, PFOA and PFOS in treated sample extracts were reduced from 1130 ng/L for the same telomeres in landfill leachate sourced directly from the landfill. In consideration of the sum of all detected telomeres in untreated PFAS in landfill leachate vs. the sum of all detected telomeres in treated samples, the present invention lowered PFAS from 18,354 ng/L in the leachate, to 6692, 6948, and 4946 ng/L in the respective T-2, T-3, and T-4 samples, and from 13,153 for detected telomeres in untreated soil sample extracts. As evidenced, the treatment technology disclosed in a preferred, but not necessarily optimized formulation, produced an end-product that not only retained PFAS that is hosted, but was also able to reduce the concentration of PFAS telomeres found in the landfill leachate. As such, the present invention provides

TABLE 9

Industrial Site - Soil B
PFAS Leachability: (Modified) Method 1312 with Subtitle D Landfill Leachate Extraction Fluid

| | | UNTREATED Soil and Subtitle D | | | TREATED Soil | | |
|---|---|---|---|---|---|---|---|
| Telomere | Chemical Name | Totals in Soil (avg.) (ng/Kg) | Totals in Landfill Leachate (ng/L) | Totals in Soil Extract (ng/L) | T-2 Soil Extract (ng/L) | T-3 Soil Extract (ng/L) | T-4 Soil Extract (ng/L) |
| PFBA | Perfluorobutanoic Acid | 264 | 1,900 | 1,800 | 1,500 | 1,500 | 1,300 |
| PFPeA | Perfluoropentanoic Acid | <0.21 | 520 | 520 | 39 | 410 | 310 |
| PFHxA | Perfluorohexanoic Acid | <0.21 | 1,600 | 1,400 | 940 | 930 | 690 |
| PFHpA | Perfluoroheptanoic Acid | <0.26 | 4,400 | 390 | 180 | 210 | 150 |
| PFOA | Perfluorooctanoic Acid | 536 | 680 | 490 | 200 | 170 | 110 |
| PFNA | Perfluorononanoic Acid | <0.26 | 87 | 38 | 16 | 12 | <10 |
| PFDA | Perfluorodecanoic Acid | 1,175 | 230 | 57 | <50 | <50 | <50 |
| PFUnA | Perfluoroundecanoic Acid | <0.26 | <50 | 51 | <50 | <50 | <50 |
| PFDoA | Perfluorododenoic Acid | 394 | <50 | <50 | <50 | <50 | <50 |
| PFTriA | Perfluorortridecanoic Acid | <0.26 | <50 | 270 | <50 | <50 | <50 |
| PFTeA | Perfluortetradecanoic Acid | 1.27 | <50 | 28 | <50 | <50 | <50 |
| PFBS | Perfluorobutanesulfonic Acid | <0.26 | 7,400 | 7,200 | 3,600 | 3,500 | 2,300 |
| PFPeS | Perfluoropentanesulfonic Acid | <0.26 | 37 | <50 | <10 | 11 | <10 |
| PFHxS | Perfluorohexanesulfonic Acid | <0.26 | 360 | 400 | 88 | 82 | <50 |
| PFHpS | Perfluoroheptanesulfonic Acid | <0.26 | <50 | <50 | <50 | <50 | <50 |
| PFOS | Perfluorooctanesulfonic Acid | 29,600 | 450 | <10 | 52 | 38 | 33 |
| PFNS | Perfluorononanesulfonic Acid | 346 | <50 | <50 | <50 | <50 | <50 |
| PFDS | Perfluorodecanesulfonic Acid | 765 | <10 | <10 | <10 | <10 | <10 |
| FtSA 4:2 | Fluorotelomer Sulfonic Acid 4:2 | <0.26 | <50 | <50 | <50 | <50 | <50 |
| FtSA 6:2 | Fluorotelomer Sulfonic Acid 6:2 | <0.26 | 690 | 400 | 77 | 85 | 53 |
| FtSA 8:2 | Fluorotelomer Sulfonic Acid 8:2 | <0.26 | <50 | <50 | <50 | <50 | <50 |
| PFOSA | Perfluorooctanesulfonaminde | 6265 | <10 | 28 | <10 | <10 | <10 |
| EtFOSSA | N-Ethylperfluorooctrane | 4,055 | <10 | <50 | <50 | <50 | <50 |
| MeFOSAA | N-Methylperfluorooctrane | <0.52 | <10 | 81 | <50 | <50 | <50 |
| PFOA + PFOS | | 30,136 | 1,130 | <500 | 252 | 208 | 143 |
| SUM PFAS | | 43,401 | 18,354 | 13,153 | 6,692 | 6,948 | 4,946 |

Total PFAS telomere concentrations in untreated soil are averages of two sample replicates as previously discussed. Total soil PFOS, in particular, was fairly elevated at 29,600 ng/Kg. With respect to the landfill leachate, PFOA and PFOS were present at 680 and 450 ng/L, respectively;

landfill owners and operators with a method that not only will allow for the acceptance of PFAS-bearing waste to be landfilled, but also another benefit where treated material will improve the quality of their leachate with respect to PFAS concentrations. Further, the present technology will beneficially remove PFAS from the PFAS cycle, thereby mitigating its migratory path through the environment and society.

Example VIII

Example VIII presents yet another benefit of the disclosed invention. Untreated and treated samples were evaluated for PFAS leachability using groundwater contaminated with PFAS obtained from the same site as the Industrial Soil B. For this Example VIII, modified Method 1312 was used to extract the soil sample, with the site groundwater substituted for the synthetic acid rain fluid. Table 10 presents total PFAS in the soil and site groundwater, and in extracts of untreated and treated soil samples T-2 and T-4, noting that T-2 contained no hydrogen peroxide and T-4 utilized a more optimized oxidant.

TABLE 10

Industrial Site—Soil B
PFAS Leachability: (MODIFIED) Method 1312
(Site Groundwater Extraction Fluid)

| | UNTREATED Soil and Groundwater | | | TREATED Soil | |
|---|---|---|---|---|---|
| Telomere | Totals in Soil (avg.) (ng/Kg) | Groundwater Extract (ng/L) | Totals in Soil Extract (ng/L) | T-2 Soil Extract (ng/L) | T-4 Soil Extract (ng/L) |
| PFBA | 264 | 640 | 620 | 144 | 144 |
| PFPeA | <0.21 | 1,100 | 1100 | 75 | <50 |
| PFHxA | <0.21 | 7,000 | 7500 | 88 | <50 |
| PFHpA | <0.26 | 7,500 | 7600 | <50 | <50 |
| PFOA | 536 | 100,000 | 94,000 | 220 | 89 |
| PFNA | <0.26 | 86 | 70 | <10 | <10 |
| PFDA | 1,175 | 96 | 57 | <50 | <50 |
| PFUnA | <0.26 | 310 | 200 | <50 | <50 |
| PFDoA | 394 | <50 | <50 | <50 | <50 |
| PFTriA | <0.26 | <50 | <50 | <50 | <50 |
| PFTeA | 1270 | <50 | <50 | <50 | <50 |
| PFBS | <0.26 | 1,000 | 980 | <10 | <10 |
| PFPeS | <0.26 | 590 | 590 | <10 | <10 |
| PFHxS | <0.26 | 4,200 | 4000 | <50 | <50 |
| PFHpS | <0.26 | 1,300 | 1000 | <50 | <50 |
| PFOS | 29,600 | 390,000 | 190,000 | 230 | 121 |
| PFNS | 346 | <50 | <50 | <50 | <50 |
| PFDS | 765 | <10 | <10 | <10 | <10 |
| FtSA 4:2 | <0.26 | <50 | <50 | <50 | <50 |
| FtSA 6:2 | <0.26 | <50 | <50 | <50 | <50 |
| FtSA 8:2 | <0.26 | <50 | <50 | <50 | <50 |
| PFOSA | 6,265 | 63 | 120 | <10 | <10 |
| EtFOSSA | 4,055 | <50 | 140 | <50 | <50 |
| MeFOSAA | <0.52 | <50 | <50 | <50 | <50 |
| PFOA + PFOS | 30,136 | 490,000 | 284,000 | 450 | 210 |
| SUM PFAS | 44,669 | 513,885 | 307,977 | 757 | 354 |

As in the other examples with Industrial Soil B, total PFAS concentrations are the average concentrations from two untreated soil replicates. Groundwater obtained from the same site as the soil was characterized as having a total sum of 490,000 ng/L of PFOA and PFOS combined, and 513,885 ng/L of PFAS telomeres from analysis. The groundwater extract of untreated samples contained a sum of 284,000 ng/L for combined PFOA and PFOS and 307,977 ng/L of detectable PFAS telomeres. It is apparent that the untreated soil did absorb some PFAS from the groundwater. With respect to the two treated samples, PFOA and PFOS totaled 450 and 210 ng/L in their respective extracts, and 757 and 354 ng/L total PFAS, respectively, for the detected telomeres. As with Example VII, soil treatments were not optimized to the specific extraction fluid used to evaluate treatment efficacy. Regardless, both T-2 and T-4 significantly reduced the leachability of PFAS from the untreated soil, and most importantly, removed PFOA and PFOS along with the other detected telomeres from the groundwater. While T-2 did not utilize any oxidant other than nitric acid and GAC-N, and had an ~4% lower dose of GAC than T-4, it still demonstrates the ability to remove a significant amount of PFAS from the environment with this technology. However, T-4, which utilized hydrogen peroxide and some phosphoric along with nitric acid, and a 5% larger dose of GAC (as GAC-P) than in T-2, clearly performed with higher efficacy. With optimization treatability studies, PFAS in extract of treated material could be removed to below the 70 ppt EPA advisory limit, despite the elevated PFAS concentrations in site groundwater.

Example VIII study data demonstrate the ability of the present invention to treat soil highly contaminated with PFAS, and to enable PFAS contamination to be managed on site. When coupled with the acid rain data of Example V, the present invention provides a unique and high performing option for environmental engineers, project owners, and other stakeholders to address PFAS at contaminated sites with a solution that not only address leachable PFAS from impacted soils and solids, but also impacted groundwater that treated material may contact. Consequently, the invention makes it possible to fix and remove PFAS from the PFAS cycle within the environment.

As shown in Tables 2-10, the present invention is highly effective at remediating mercury-contaminated soil and PFAS-contaminated soil. A reagent blend prepared according to the invention reduces the leachability of mercury from contaminated soil to below the 0.2 mg/L RCRA limit for hazardous waste, as determined by analyzing total mercury in EPA's Method 1311 (TCLP) extract, as well as the EPA's LDR limit of <0.025 mg/L. Similarly, the amount of PFAS leaching from contaminated material treated with the present invention was reduced to <70 ppt, as determined by analyzing total PFAS by telomere in Method 1311 (TCLP) extract, and in extract of Method 1312 (SPLP). The TCLP extraction sample preparation method is used to evaluate how contaminants (e.g. mercury, PFAS, etc.) in treated material may respond to synthetic leachate in a landfill, and the SPLP preparation method is used to determine how the contaminants in treated material may respond to acid rain if the treated material were to be left onsite or placed where it may be exposed to precipitation.

As measured in separate testing, that same reagent blend reduced leachable PFAS telomeres from the same treated soil as measured by analyzing total PFAS by telomere in extracts of modified Method 1312 using actual landfill leachate in one test, and actual groundwater in another where both leachate and groundwater contained PFAS. The invention not only reduces PFAS leachability from treated waste, but it also (a) reduces leachability of PFAS when contaminated material that has been treated is exposed to actual landfill leachate or groundwater, where both fluids are contaminated with PFAS that are not sourced from the soil, and (b) generates a treatment end-product that removes PFAS from the actual contaminated groundwater or leachate that treated material may contact where it is disposed or managed, as determined using the modified test Method 1312 (described in Examples VII and VIII).

Upon reading this disclosure, other embodiments and modifications may be apparent to the skilled person. The present invention is limited only by the appended claims and equivalents thereof.

What is claimed is:

1. A method of treating material contaminated with PFAS or a heavy metal to obtain a treated product having reduced contaminant leachability, comprising:
    admixing the contaminated material with a reagent set comprising an acid selected from the group consisting of phosphoric acid, nitric acid, sulfuric acid, acetic acid, peracetic acid, peroxydisulfuric acid, peroxymonosulfuric acid, and compatible mixtures thereof; an oxidant selected from the group consisting of nitric acid, hydrogen peroxide, sodium persulfate, potassium persulfate, ammonium persulfate, sulfuric acid, peroxydisulfuric acid, peroxymonosulfuric acid, peroxyacetate, and compatible mixtures thereof; and an adsorbent comprising powdered activated carbon and/or granular activated carbon; and
    adding water in an amount of 5-10% by weight of the contaminated material.

2. The method of claim 1, wherein the contaminated material is provided as a dry solid.

3. The method of claim 1, wherein the contaminated material is provided as a wet solid having moisture of up to 60% by weight.

4. The method of claim 1, wherein the contaminated material is provided as a sediment, sludge or slurry having a solids content of at least 5% by weight.

5. The method of claim 1, wherein the reagent set consists essentially of (a) nitric acid and activated carbon, (b) nitric acid, hydrogen peroxide, and activated carbon, or (c) nitric acid, phosphoric acid, hydrogen peroxide, and activated carbon.

6. The method of claim 1, wherein the reagent set consists essentially of phosphoric acid, hydrogen peroxide, and activated carbon.

7. The method of claim 1, wherein the reagent set consists essentially of acetic acid and/or peracetic acid, peroxyacetate and/or hydrogen peroxide, and activated carbon.

8. The method of claim 1, wherein the reagent set consists essentially of sulfuric acid, a persulfate and/or hydrogen peroxide, and activated carbon.

9. The method of claim 1, wherein the adsorbent is granular activated carbon that is saturated in water that was adjusted to a pH of 5.5 S.U. with nitric or phosphoric acid prior to being admixed with the contaminated material.

10. A method of reducing mercury leachability of mercury-contaminated solid material to below 0.2 mg/L, comprising:
    admixing the mercury-contaminated solid material with a sufficient dose of a reagent set comprising nitric or phosphoric acid, hydrogen peroxide, and activated carbon; and
    adding water in an amount of 5-10% by weight of the contaminated material, thereby forming a treated material that leaches mercury in an amount <0.2 mg/L, as measured in EPA Method 1311 (TCLP) extract.

11. A method of reducing PFAS leachability from biosolids formed at a sewage treatment plant, comprising:
    admixing the biosolids with a sufficient dose of a reagent set comprising nitric acid and activated carbon; and
    adding water in an amount up to 10% by weight of the contaminated material, thereby forming a treated material that leaches PFAS in an amount less than untreated biosolids, as measured in EPA Method 1311 (TCLP) extract.

12. The method of claim 11, wherein the activated carbon is granular activated carbon.

13. A method of reducing the PFAS leachability of PFAS-contaminated soil, comprising:
    admixing the contaminated soil with a sufficient dose of a reagent set comprising (a) nitric acid and activated carbon, (b) nitric acid, hydrogen peroxide, and activated carbon, or (c) nitric acid, phosphoric acid, hydrogen peroxide, and activated carbon; and
    adding water in an amount of 5-10% by weight of the contaminated material, thereby forming a treated material that leaches less than 70 ng/L PFAS, as measured in EPA Method 1311 (TCLP) extract, EPA Method 1312 (SPLP) extract, or EPA modified Method 1312 extract, where the modification is use of deionized laboratory water extraction fluid.

14. A method of reducing the PFAS leachability of PFAS-contaminated soil, comprising:
    admixing the contaminated soil with a sufficient dose of a reagent set comprising (a) nitric acid and activated carbon, (b) nitric acid, hydrogen peroxide, and activated carbon, or (c) nitric acid, phosphoric acid, hydrogen peroxide, and activated carbon; and
    adding water in an amount of 5-10% by weight of the contaminated material and thereby forming a treated material that removes >40% of PFAS in a landfill leachate or contaminated groundwater that contacts treated material, as measured in EPA modified Method 1312 extract, where the modification is use of Subtitle D landfill leachate extraction fluid or contaminated groundwater extraction fluid.

* * * * *